(12) United States Patent
Zhao et al.

(10) Patent No.: US 12,460,207 B2
(45) Date of Patent: Nov. 4, 2025

(54) INHIBITING APE2 EXPRESSION IN A SUBJECT TREATED WITH A DRUG AGENT THAT CAUSES INCREASED APE2 EXPRESSION

(71) Applicant: The Cleveland Clinic Foundation, Cleveland, OH (US)

(72) Inventors: Jianjun Zhao, Cleveland, OH (US); Jianhong Lin, Cleveland, OH (US)

(73) Assignee: The Cleveland Clinic Foundation, Cleveland, OH (US)

( * ) Notice: Subject to any disclaimer, the term of this patent is extended or adjusted under 35 U.S.C. 154(b) by 0 days.

(21) Appl. No.: 17/696,510

(22) Filed: Mar. 16, 2022

(65) Prior Publication Data

US 2022/0307034 A1    Sep. 29, 2022

Related U.S. Application Data

(60) Provisional application No. 63/161,779, filed on Mar. 16, 2021.

(51) Int. Cl.
| | |
|---|---|
| *C12N 15/113* | (2010.01) |
| *A61K 31/085* | (2006.01) |
| *A61K 31/14* | (2006.01) |
| *A61K 31/282* | (2006.01) |
| *A61K 31/381* | (2006.01) |
| *A61K 31/427* | (2006.01) |
| *A61K 31/454* | (2006.01) |

(Continued)

(52) U.S. Cl.
CPC ........ *C12N 15/1137* (2013.01); *A61K 31/085* (2013.01); *A61K 31/14* (2013.01); *A61K 31/282* (2013.01); *A61K 31/381* (2013.01); *A61K 31/427* (2013.01); *A61K 31/454* (2013.01); *A61K 31/4985* (2013.01); *A61K 31/506* (2013.01); *A61K 31/519* (2013.01); *A61K 31/549* (2013.01); *A61K 31/7056* (2013.01); *A61K 33/243* (2019.01); *A61K 39/3955* (2013.01); *A61P 13/12* (2018.01); *C12N 2310/11* (2013.01)

(58) Field of Classification Search
CPC ................ A61K 31/282; A61K 33/243; C12N 15/1137; C12N 2310/11; C12N 2310/14
See application file for complete search history.

(56) References Cited

U.S. PATENT DOCUMENTS

| | | |
|---|---|---|
| 6,406,917 B1 | 6/2002 | Kelley |
| 9,359,605 B2 | 6/2016 | Vincent et al. |
| 2021/0106574 A1 | 4/2021 | Feng et al. |

FOREIGN PATENT DOCUMENTS

WO    WO 2003/007955    1/2003

OTHER PUBLICATIONS

Matthew and Filby (Johnson Matthey Technol Rev., 2017 vol. 61:32-39).*

(Continued)

*Primary Examiner* — Terra C Gibbs

(74) *Attorney, Agent, or Firm* — Jason R. Bond; Casimir Jones, S.C.

(57) ABSTRACT

Provided herein are compositions, systems, articles of manufacture, and methods of treating a subject with: i) an APE2 inhibitor, and ii) a drug agent that causes increased expression of APE2 in said subject. In certain embodiments, the drug agent is Cisplatin or similar drug.

5 Claims, 9 Drawing Sheets
(8 of 9 Drawing Sheet(s) Filed in Color)
Specification includes a Sequence Listing.

(51) Int. Cl.
  A61K 31/4985   (2006.01)
  A61K 31/506    (2006.01)
  A61K 31/519    (2006.01)
  A61K 31/549    (2006.01)
  A61K 31/7056   (2006.01)
  A61K 33/243    (2019.01)
  A61K 39/395    (2006.01)
  A61P 13/12     (2006.01)

(56) References Cited

OTHER PUBLICATIONS

Zheng et al. (World J Clin Cases 2020 vol. 14:2917-2929).*
Wang et al. (Oncology Letters, 2019 vol. 17:3305-3313).*
Ishikawa (World Journal of Hepatology, 2009 vol. 18-16).*
Scanlon et al. (Current Pharmaceutical Biotechnology, 2004 vol. 5:415-420).*
New Zealand Data Sheet. Cisplatin. https://www.medsafe.govt.nz/profs/datasheet/d/DBLCisplatininj.pdf. Downloaded on Dec. 19, 2024.*
Equivalent Surface Area Dosage Conversion Factors (Guidance Posted Aug. 2007).*
Saadh et al. (Systematic Reviews in Pharmacy vol. 11., Issue 8, Aug.-Sep. 2020).*
Jurket et al. (Onkologie 2013;36:49-52).*
Charlier et al. (Journal of Analytical Toxicology, vol. 28, Mar. 2004, pp. 138-140).*
Ganguly et al. (Journal of Translational Medicine (2024) 22:789, pp. 1-11).*
Alexeyev et al., The maintenance of mitochondrial DNA integrity—critical analysis and update. Cold Spring Harb Perspect Biol. May 1, 2013;5(5):a012641.
Bhargava et al., Mitochondrial energetics in the kidney. Nat Rev Nephrol. Oct. 2017;13(10):629-646.
Boulikas et al., Cisplatin and platinum drugs at the molecular level. (Review). Oncol Rep. Nov.-Dec. 2003;10(6):1663-82.
Burkovics et al., Role of PCNA-dependent stimulation of 3'-phosphodiesterase and 3'-5' exonuclease activities of human Ape2 in repair of oxidative DNA damage. Nucleic Acids Res. Jul. 2009;37(13):4247-55.
Chaudhari et al., Apurinic/Apyrimidinic Endonuclease 2 (APE2): An ancillary enzyme for contextual base excision repair mechanisms to preserve genome stability. Biochimie. Nov. 2021;190:70-90.
Cleveland Clinic. Potential new target for treating chemotherapy associated kidney damage. Lerner Research Institute News. Dec. 31, 2020. Retrieved Apr. 14, 2022. 7 pages.
Cleveland Clinic. Potential target identified for treating chemotherapy associated kidney damage. ConsulQD, Aug. 24, 2021. 5 pages.
Cline. Mitochondrial DNA damage and its consequences for mitochondrial gene expression. Biochim Biophys Acta. Sep.-Oct. 2012;1819(9-10):979-91.
Creative Biolabs. Small interfering RNA (siRNA), Anti-human APEX2, 2'-Omethoxyethyl (2'-MOE). Retrieved from the internet Apr. 14, 2022. 2 pages.
Crooke et al., The Effects of 2'-O-Methoxyethyl Oligonucleotides on Renal Function in Humans. Nucleic Acid Ther. Feb. 2018;28(1):10-22.
Fonseca et al., Mitochondrial fission requires DRP1 but not dynamins. Nature. Jun. 2019;570(7761):E34-E42.
Galea et al., The interaction of cisplatin and analogues with DNA in reconstituted chromatin. Biochim Biophys Acta. Dec. 12, 2002;1579(2-3):142-52.
Guikema et al., Apurinic/apyrimidinic endonuclease 2 is necessary for normal B cell development and recovery of lymphoid progenitors after chemotherapeutic challenge. J Immunol. Feb. 15, 2011;186(4):1943-50.
Hatch et al., Novel roles for actin in mitochondrial fission. J Cell Sci. Nov. 1, 2014;127(Pt 21):4549-60.
Heath et al., Nonmuscle myosin heavy chain IIA mutations define a spectrum of autosomal dominant macrothrombocytopenias: May-Hegglin anomaly and Fechtner, Sebastian, Epstein, and Alport-like syndromes. Am J Hum Genet. Nov. 2001;69(5):1033-45.
Hossain et al., APE2 is a General Regulator of the ATR-Chk1 DNA Damage Response Pathway to Maintain Genome Integrity in Pancreatic Cancer Cells. Front Cell Dev Biol. Nov. 2, 2021;9:738502.
Hu et al., Cisplatin-Mediated Upregulation of APE2 Binding to MYH9 Provokes Mitochondrial Fragmentation and Acute Kidney Injury. Cancer Res. Feb. 1, 2021;81(3):713-723.
Hu et al., Targeting the MALAT1/PARP1/LIG3 complex induces DNA damage and apoptosis in multiple myeloma. Leukemia. Oct. 2018;32(10):2250-2262.
Hussan et al., A review on recent advances of enteric coating. IOSR Journal of Pharmacy, e-ISSN: 2250-3013, p-ISSN: 2319-4219, vol. 2 Issue 6, Nov.-Dec. 2012, pp. 05-11.
Ide et al., Characterization of the genomic structure and expression of the mouse Apex2 gene. Genomics. Jan. 2003;81(1):47-57.
Ide et al., Growth retardation and dyslymphopoiesis accompanied by G2/M arrest in APEX2-null mice. Blood. Dec. 15, 2004;104(13):4097-103.
Jensen et al., Genomic alterations and abnormal expression of APE2 in multiple cancers. Sci Rep. Feb. 28, 2020;10(1):3758. 11 pages.
Johnstone et al., Podocyte-specific deletion of Myh9 encoding nonmuscle myosin heavy chain 2A predisposes mice to glomerulopathy. Mol Cell Biol. May 2011;31(10):2162-70.
Korobova et al., A role for myosin II in mammalian mitochondrial fission. Curr Biol. Feb. 17, 2014;24(4):409-14.
Lennox et al., Cellular localization of long non-coding RNAs affects silencing by RNAi more than by antisense oligonucleotides. Nucleic Acids Res. Jan. 29, 2016;44(2):863-77.
Lin et al., Function and molecular mechanisms of APE2 in genome and epigenome integrity. Mutat Res. 2021; 787: 108347. 32 pages.
Lin et al., APE2 promotes DNA damage response pathway from a single-strand break. Nucleic Acids Res. Mar. 16, 2018;46(5):2479-2494.
Ma et al., The role of vertebrate nonmuscle Myosin II in development and human disease. Bioarchitecture. 2014;4(3):88-102.
Ma et al., Ablation of nonmuscle myosin II-B and II-C reveals a role for nonmuscle myosin II in cardiac myocyte karyokinesis. Mol Biol Cell. Nov. 15, 2010;21(22):3952-62.
Otterpohl et al., Nonmuscle myosin 2 proteins encoded by Myh9, Myh10, and Myh14 are uniquely distributed in the tubular segments of murine kidney. Physiol Rep. Dec. 2017;5(23):e13513.
Ozkok et al., Pathophysiology of cisplatin-induced acute kidney injury. Biomed Res Int. 2014;2014:967826.
Partridge et al., Improvements in the Tolerability Profile of 2'-O-Methoxyethyl Chimeric Antisense Oligonucleotides in Parallel with Advances in Design, Screening, and Other Methods. Nucleic Acid Ther. Dec. 2021;31(6):417-426.
Pecci et al., Position of nonmuscle myosin heavy chain IIA (NMMHC-IIA) mutations predicts the natural history of MYH9-related disease. Hum Mutat. Mar. 2008;29(3):409-17.
Perse et al., Cisplatin-Induced Rodent Model of Kidney Injury: Characteristics and Challenges. Biomed Res Int. Sep. 12, 2018;2018:1462802.
Quark Pharmaceuticals. A Dose Escalation and Safety Study of 15NP in Patients Undergoing Major Cardiovascular Surgery. ClinicalTrials.gov . NIH, NCT00554359. First posted Nov. 6, 2007. Retrieved Apr. 14, 2022. 8 pages.
Quemener et al., Small Drugs, Huge Impact: The Extraordinary Impact of Antisense Oligonucleotides in Research and Drug Development. Molecules. Jan. 15, 2022;27(2):536.
Reyes et al., Actin and myosin contribute to mammalian mitochondrial DNA maintenance. Nucleic Acids Res. Jul. 2011;39(12):5098-108.
Safirstein et al., Uptake and metabolism of cisplatin by rat kidney. Kidney Int. May 1984;25(5):753-8.
Saki et al., DNA damage related crosstalk between the nucleus and mitochondria. Free Radic Biol Med. Jun. 2017;107:216-227.

(56) References Cited

OTHER PUBLICATIONS

Sciabola et al., PFRED: A computational platform for siRNA and antisense oligonucleotides design. PLoS One. Jan. 22, 2021;16(1):e0238753. 11 pages.

Sharp et al., Developing better mouse models to study cisplatin-induced kidney injury. Am J Physiol Renal Physiol. Oct. 1, 2017;313(4):F835-F841.

Stavnezer et al., Differential expression of APE1 and APE2 in germinal centers promotes error-prone repair and A:T mutations during somatic hypermutation. Proc Natl Acad Sci U S A. Jun. 24, 2014;111(25):9217-22.

The Pipette Gazette, Meet the Researcher: Jessye Castro Researches Protein Associated with Severe Developmental Disorders. UT Health San Antonio, Graduate School of Biomedical Sciences, 2020. 5 pages.

Townsend et al., Role of glutathione S-transferase Pi in cisplatin-induced nephrotoxicity. Biomed Pharmacother. Feb. 2009;63(2):79-85.

Trenner et al., Harnessing DNA Double-Strand Break Repair for Cancer Treatment. Front Oncol. Dec. 10, 2019;9:1388. 10 pages.

Tsuchimoto et al., Human APE2 protein is mostly localized in the nuclei and to some extent in the mitochondria, while nuclear APE2 is partly associated with proliferating cell nuclear antigen. Nucleic Acids Res. Jun. 1, 2001;29(11):2349-60.

Tsuruya et al., Direct involvement of the receptor-mediated apoptotic pathways in cisplatin-induced renal tubular cell death. Kidney Int. Jan. 2003;63(1):72-82.

Tzur et al., Missense mutations in the APOL1 gene are highly associated with end stage kidney disease risk previously attributed to the MYH9 gene. Hum Genet. Sep. 2010;128(3):345-50.

Ventura et al., Restoration of p53 function leads to tumour regression in vivo. Nature. Feb. 8, 2007;445(7128):661-5.

Wang et al., Nonmuscle myosin II isoform and domain specificity during early mouse development. Proc Natl Acad Sci U S A. Aug. 17, 2010;107(33):14645-50.

Wei et al., Differential gender differences in ischemic and nephrotoxic acute renal failure. Am J Nephrol. Sep.-Oct. 2005;25(5):491-9.

Zhang et al., Mouse models of MYH9-related disease: mutations in nonmuscle myosin II-A. Blood. Jan. 5, 2012;119(1):238-50.

\* cited by examiner

SEQUENCE LISTING

```
<160> NUMBER OF SEQ ID NOS: 23

<210> SEQ ID NO 1
<211> LENGTH: 16
<212> TYPE: DNA
<213> ORGANISM: Artificial sequence
<220> FEATURE:
<223> OTHER INFORMATION: Synthetic nucleotide

<400> SEQUENCE: 1
uguccttaca gaaggu                                                    16

<210> SEQ ID NO 2
<211> LENGTH: 14
<212> TYPE: DNA
<213> ORGANISM: Artificial sequence
<220> FEATURE:
<223> OTHER INFORMATION: Synthetic nucleotide

<400> SEQUENCE: 2
aggccttctt cagc                                                      14
```

-continued

<210> SEQ ID NO 3
<211> LENGTH: 16
<212> TYPE: DNA
<213> ORGANISM: Artificial sequence
<220> FEATURE:
<223> OTHER INFORMATION: Synthetic nucleotide

<400> SEQUENCE: 3
auccatgttt ccauag                                                    16

<210> SEQ ID NO 4
<211> LENGTH: 14
<212> TYPE: DNA
<213> ORGANISM: Artificial sequence
<220> FEATURE:
<223> OTHER INFORMATION: Synthetic nucleotide

<400> SEQUENCE: 4
aactaggaag cgaa                                                      14

<210> SEQ ID NO 5
<211> LENGTH: 14
<212> TYPE: DNA
<213> ORGANISM: Artificial sequence
<220> FEATURE:
<223> OTHER INFORMATION: Synthetic nucleotide

<400> SEQUENCE: 5
acatggctcc cugu                                                      14

<210> SEQ ID NO 6
<211> LENGTH: 16
<212> TYPE: DNA
<213> ORGANISM: Artificial sequence
<220> FEATURE:
<223> OTHER INFORMATION: Synthetic nucleotide

<400> SEQUENCE: 6
cuagcacaca tguaga                                                    16

<210> SEQ ID NO 7
<211> LENGTH: 14
<212> TYPE: DNA
<213> ORGANISM: Artificial sequence
<220> FEATURE:
<223> OTHER INFORMATION: Synthetic nucleotide

<400> SEQUENCE: 7
cagctgggcc ugcu                                                      14

<210> SEQ ID NO 8
<211> LENGTH: 25
<212> TYPE: DNA
<213> ORGANISM: Artificial sequence
<220> FEATURE:
<223> OTHER INFORMATION: Synthetic nucleotide

<400> SEQUENCE: 8
ggauguuggu ugcuauggaa acatg                                          25

<210> SEQ ID NO 9
<211> LENGTH: 27
<212> TYPE: RNA
<213> ORGANISM: Artificial sequence
<220> FEATURE:

```
<223> OTHER INFORMATION: Synthetic nucleotide

<400> SEQUENCE: 9
cauguuucca uagcaaccaa caucccc                                              27

<210> SEQ ID NO 10
<211> LENGTH: 23
<212> TYPE: DNA
<213> ORGANISM: Artificial sequence
<220> FEATURE:
<223> OTHER INFORMATION: Synthetic nucleotide

<400> SEQUENCE: 10
gauccgcaca ugggaaggua att                                                  23

<210> SEQ ID NO 11
<211> LENGTH: 23
<212> TYPE: DNA
<213> ORGANISM: Artificial sequence
<220> FEATURE:
<223> OTHER INFORMATION: Synthetic nucleotide

<400> SEQUENCE: 11
uuaccuuccc atgugcggau ctt                                                  23

<210> SEQ ID NO 12
<211> LENGTH: 25
<212> TYPE: DNA
<213> ORGANISM: Artificial sequence
<220> FEATURE:
<223> OTHER INFORMATION: Synthetic nucleotide

<400> SEQUENCE: 12
agucagagaa gcuaucucaa uactt                                                25

<210> SEQ ID NO 13
<211> LENGTH: 27
<212> TYPE: RNA
<213> ORGANISM: Artificial sequence
<220> FEATURE:
<223> OTHER INFORMATION: Synthetic nucleotide

<400> SEQUENCE: 13
aaguauugag auagcuucuc ugacuca                                              27

<210> SEQ ID NO 14
<211> LENGTH: 21
<212> TYPE: RNA
<213> ORGANISM: Artificial sequence
<220> FEATURE:
<223> OTHER INFORMATION: Synthetic nucleotide

<400> SEQUENCE: 14
uuauaacccu caacgauagc c                                                    21

<210> SEQ ID NO 15
<211> LENGTH: 21
<212> TYPE: RNA
<213> ORGANISM: Artificial sequence
<220> FEATURE:
<223> OTHER INFORMATION: Synthetic nucleotide

<400> SEQUENCE: 15
cuaucguuga ggguuauaac u                                                    21
```

<210> SEQ ID NO 16
<211> LENGTH: 21
<212> TYPE: RNA
<213> ORGANISM: Artificial sequence
<220> FEATURE:
<223> OTHER INFORMATION: Synthetic nucleotide

<400> SEQUENCE: 16
ugaaauagga guuauaaccc u                                              21

<210> SEQ ID NO 17
<211> LENGTH: 21
<212> TYPE: RNA
<213> ORGANISM: Artificial sequence
<220> FEATURE:
<223> OTHER INFORMATION: Synthetic nucleotide

<400> SEQUENCE: 17
gguuauaacu ccuauuucag c                                              21

<210> SEQ ID NO 18
<211> LENGTH: 21
<212> TYPE: RNA
<213> ORGANISM: Artificial sequence
<220> FEATURE:
<223> OTHER INFORMATION: Synthetic nucleotide

<400> SEQUENCE: 18
uaaacucauc cauguuucca u                                              21

<210> SEQ ID NO 19
<211> LENGTH: 20
<212> TYPE: RNA
<213> ORGANISM: Artificial sequence
<220> FEATURE:
<223> OTHER INFORMATION: Synthetic nucleotide

<400> SEQUENCE: 19
ggaaacaugg augaguuuac                                                20

<210> SEQ ID NO 20
<211> LENGTH: 21
<212> TYPE: RNA
<213> ORGANISM: Artificial sequence
<220> FEATURE:
<223> OTHER INFORMATION: Synthetic nucleotide

<400> SEQUENCE: 20
ucaucuuugg cuucugaagu c                                              21

<210> SEQ ID NO 21
<211> LENGTH: 21
<212> TYPE: RNA
<213> ORGANISM: Artificial sequence
<220> FEATURE:
<223> OTHER INFORMATION: Synthetic nucleotide

<400> SEQUENCE: 21
cuucagaagc caaagaugag a                                              21

<210> SEQ ID NO 22
<211> LENGTH: 21
<212> TYPE: RNA
<213> ORGANISM: Artificial sequence
<220> FEATURE:
<223> OTHER INFORMATION: Synthetic nucleotide

```
<400> SEQUENCE: 22
agaaugaggu ccguaacucc u                                              21

<210> SEQ ID NO 23
<211> LENGTH: 21
<212> TYPE: RNA
<213> ORGANISM: Artificial sequence
<220> FEATURE:
<223> OTHER INFORMATION: Synthetic nucleotide

<400> SEQUENCE: 23
gaguuacgga ccucauucug g                                              21
```

INHIBITING APE2 EXPRESSION IN A SUBJECT TREATED WITH A DRUG AGENT THAT CAUSES INCREASED APE2 EXPRESSION

The present application claims priority to U.S. Provisional application Ser. No. 63/161,779, filed Mar. 16, 2021, which is herein incorporated by reference in its entirety.

STATEMENT REGARDING FEDERAL FUNDING

This invention was made with government support under grant number CA251141 awarded by the National Institutes of Health. The government has certain rights in the invention.

SEQUENCE LISTING

The text of the computer readable sequence listing filed herewith, titled "39367-202_SEQUENCE_ LISTING_ST25", created May 24, 2022, having a file size of 4,790 bytes, is hereby incorporated by reference in its entirety.

FIELD

Provided herein are compositions, systems, articles of manufacture, and methods of treating a subject with: i) an APE2 inhibitor, and ii) a drug agent that causes increased expression of APE2 in said subject. In certain embodiments, the drug agent is Cisplatin or similar drug.

BACKGROUND

Cisplatin (75 mg/m$^2$) is standard chemotherapy in the treatment of various solid tumors. However, at this dose, significant acute kidney injury (AKI) occurs, often necessitating dose reduction or withdrawal (1). Because intracellular chloride concentration is typically low, the chlorine atoms in cisplatin are quickly replaced by water molecules, and the resulting product is actually the species that reacts with glutathione in the cytoplasm and with DNA in the nucleus (2). In rapidly dividing tumor cells, cisplatin-DNA intrastrand and interstrands crosslinking arrests DNA replication, cell proliferation, resulting in further cytotoxicity (3). Within 24 hours of administration, 50%-80% of cisplatin is excreted via the urine, and the platinum concentration in the renal cortex is several-fold higher than in other organs (4). Cisplatin predominantly damages the proximal tubule cells (PTC), decreasing the glomerular filtration rate (5). Even though nonproliferating PTCs are generally less sensitive to other DNA-damaging agents, cisplatin selectively injures PTCs, as manifested by both necrosis and apoptosis (6). Second only to the heart, kidneys have the greatest mitochondrial content and oxygen consumption rate (OCR). Moreover, kidney PTCs contain more mitochondria than any other cellular organelle because this organ requires sufficient energy to reabsorb 80% of the filtrate that passes through the glomeruli, including toxins such as cisplatin (7). Thus, PTC vulnerability to cisplatin may reflect the kidney's ability to accumulate and retain platinum to a greater degree than other organs.

SUMMARY

Provided herein are compositions, systems, articles of manufacture, and methods of treating a subject with: i) an APE2 inhibitor, and ii) a drug agent that causes increased expression of APE2 in said subject. In certain embodiments, the drug agent is Cisplatin or similar drug.

In some embodiments, provided herein are systems comprising: i) an APE2 inhibitor, and ii) a drug agent that causes increased expression of APE2 when administered to a subject. In certain embodiments, provided herein are compositions comprising: i) an APE2 inhibitor, and ii) a drug agent that causes increased expression of APE2 when administered to a subject. In other embodiments, provided herein are articles of manufacture comprising an orally ingestible pill or capsule, wherein the orally ingestible pill or capsule comprises: a) a composition comprising: i) an APE2 inhibitor, and ii) a drug agent that causes increased expression of APE2 when administered to a subject; and b) an enteric coating which surrounds the composition. In certain embodiments, the pill or capsule comprises a capsule, wherein the capsule comprises a softgel. In additional embodiments, the softgel comprises gelatin. In other embodiments, the composition further comprises a solvent.

In certain embodiments, provided herein are methods comprising: treating a subject with: i) an APE2 inhibitor, and ii) a drug agent that causes increased expression of APE2 in the subject. In additional embodiments, the APE2 inhibitor is administered before the drug agent. In other embodiments, the APE2 inhibitor is administered after the drug agent. In further embodiments, the APE2 inhibitor and the drug agent are administered at the same time or about the same time.

In particular embodiments, the drug agent comprises Cisplatin. In other embodiments, the drug agent comprises a platinum based drug, Carboplatin, or oxaliplatin. In other embodiments, the subject is administered an amount of the drug agent that is higher than is clinically possible without administering the APE2 inhibitor. In additional embodiments, the APE2 inhibitor comprises an antisense oligonucleotide directed toward APE2 mRNA or DNA. In other embodiments, the APE2 inhibitor comprises an siRNA sequence directed toward APE2 mRNA. In additional embodiments, the APE2 inhibitor is selected from the group consisting of: Acadesine, AZD3514, CP-335963, Dasatinib, CNX-774, Calmidazolium chloride, NU7441 (KU-57788), DL-Thiorphan, GSK1292263, AZD1080, Thioperamide maleate, AEG 3482, Baricitinib (LY3009104, INCB02805), Tofacitinib (CP-690550) Citrate, S-Ruxolitinib (INCB018424), Phenelzine sulfate, and Chloramphenicol, or any combination thereof. In other embodiments, the APE2 inhibitor is selected from the group consisting of: A-205804, Trichlormethiazide, Salinomycin, Sulindac, Domiphen Bromide, Erdosteine, Monobenzone, Thiabendazole, 6(5H)-Phenanthridlnone, Tadalafil, Tetradecylthioacetic acid, AC-93253 Iodide, Protriptyline hydrochloride, Pomalidomide, and BMS-193885.

In particular embodiments, the subject has cancer. In further embodiments, the drug agent causes acute kidney injury in the subject in the absence of the APE2 inhibitor. In additional embodiments, the subject is a human. In certain embodiments, the APE2 inhibitor comprises an antibody or antigen binding fragment thereof directed to APE2 protein. In certain embodiments, the antibody is a monoclonal antibody or antigen binding portion thereof (e.g., Fab). In additional embodiments, the methods further comprise detecting, in a sample from the subject, the level of APE2 mRNA or protein.

In some embodiments, provided herein is a composition comprising a nucleotide sequence, wherein said nucleotide sequence comprises, consists essentially of, or consists of a nucleic acid sequence comprising anyone (or any combination) of SEQ ID NOs: 1-22.

DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
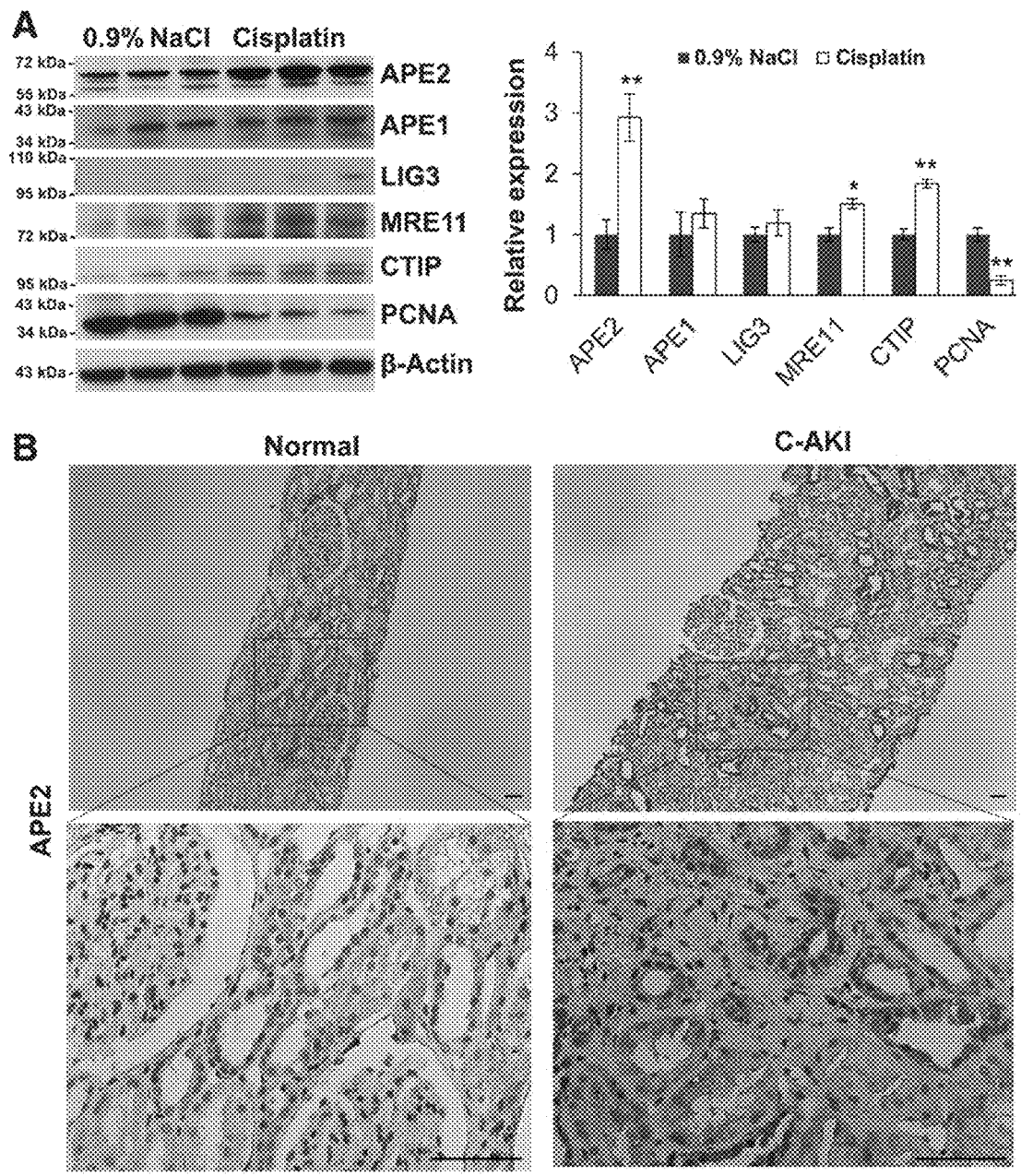
FIG. 1. Cisplatin induces APE2 overexpression in mouse kidney cells. A, Western blot results for APE2, APE1, LIG3, MRE11, CTIP, PCNA, and actin expression in cisplatin- and vehicle-treated wild-type C57B6 mice kidney samples collected 3 days after treatment (n=3). *, $P<0.05$; **, $P<0.01$. B, Representative IHC results for APE2 in kidney biopsies from healthy donors (n=10) and C-AKI patients (n=2). Scale bar, 100 μm.

Provided herein are compositions, systems, articles of manufacture, and methods of treating a subject with: i) an APE2 inhibitor, and ii) a drug agent that causes increased expression of APE2 in said subject. In certain embodiments, the drug agent is Cisplatin or similar drug.

In work conducted during the development of embodiments herein, a novel function for APE2 was identified, namely that APE2 mediates cisplatin-induced AKI (C-AKI) even in the absence of cisplatin-induced Pt-DNA adducts in kidney PTCs. Such work has revealed that cisplatin increases APE2 protein responses to DNA damage in PTCs. APE2 transgenic mice phenotypically recapitulated the pathophysiological features of C-AKI without cisplatin treatment. APE2 binds myosin heavy-chain 9 (MYH9) protein in mitochondria after cisplatin treatment. Human MYH9-related disorder is caused by MYH9 mutations that ultimately lead to nephritis, macrothrombocytopenia, and deafness. As such, APE2 inhibiting agents may be used in conjunction with Cisplatin or other APE2 up regulating drugs (to reduce or eliminate the unwanted effects of Cisplatin or other APE up regulating drug).

APE2 Anti-Sense Oligonucleotides (ASOs)

In certain embodiments, anti-sense oligonucleotides are employed to inhibit APE2. Such ASOs can be generated, for example, using known software and methods (see, e.g., Sciabola et al., "PFRED: A computational platform for siRNA and antisense oligonucleotides design," PLoS One, Jan. 22, 2021, pgs 1-11, herein incorporated by reference in its entirety, particularly for teaching generating ASOs). In certain embodiments, the ASOs are any of SEQ ID NOs:1-7 described below, or variants thereof (e.g., one base truncations or additions). In the following sequences, an asterisk denotes a phosphorothioate linkage, and mG and mU are 2'-OMe modifications of these nucleotides. Some or all of these modifications may or may not be present in a particular sequence.

```
                                          (SEQ ID NO: 1)
mU*mG*mU*C*C*T*T*A*C*A*G*A*A*mG*mG*mU (SEQ ID NO: 2)
mA*mG*mG*mC*C*T*T*C*T*T*C*mA*mG*mC (SEQ ID NO: 3)
mA*mU*mC*mC*A*T*G*T*T*T*C*C*mA*mU*mA*mG (SEQ ID NO: 4)
mA*mA*mC*T*A*G*G*A*A*G*C*mG*mA*mA*

(SEQ ID NO: 5)
mA*mC*mA*T*G*G*C*T*C*C*C*mU*mG*mU*

(SEQ ID NO: 6)
mC*mU*mA*mG*C*A*C*A*C*A*T*G*mU*mA*mG*mA*

(SEQ ID NO: 7)
mC*mA*mG*mC*T*G*G*G*C*C*mU*mG*mC*mU*
``` siRNA and shRNA Sequences to APE2:

In some embodiments, siRNA oligonucleotides are employed to inhibit APE2. Such siRNAs or shRNAs can be generated, for example, using known software and methods (see, e.g., Sciabola et al., "PFRED: A computational platform for siRNA and antisense oligonucleotides design," PLoS One, Jan. 22, 2021, pgs 1-11, herein incorporated by reference in its entirety, particularly for teaching generating siRNAs and shRNAs). In certain embodiments, the siRNAs or shRNAs are any of SEQ ID NOs:8-23 described below, or variants thereof (e.g., one base truncations or additions).

```
sihAPEX2-1F
                                          (SEQ ID NO: 8)
rGrGrArUrGrUrUrGrGrUrUrGrCrUrArUrGrGrArArArCrATG sihAPEX2-1R
                                          (SEQ ID NO: 9)
rCrArUrGrUrUrCrCrArUrArGrCrArArCrCrArArCrArUrCrC
rCrC sihAPEX2-2F
                                         (SEQ ID NO: 10)
rGrArUrCrCrGrCrArCrArUrGrGrGrArArGrGrUrArATT sihAPEX2-2R
                                         (SEQ ID NO: 11)
rUrUrArCrCrUrUrCrCrCrArTrGrUrGrCrGrGrArUrCTT sihAPEX2-3F
                                         (SEQ ID NO: 12)
rArGrUrCrArGrArGrArArGrCrUrArUrCrUrCrArArUrArCTT sihAPEX2-3R
                                         (SEQ ID NO: 13)
rArArGrUrArUrUrGrArGrArUrArGrCrUrUrCrUrCrUrGrArCrU
rCrA sihAPEX2-4F
                                         (SEQ ID NO: 14)
rUrUrArUrArArCrCrCrUrCrArArCrGrArUrArGrCrC sihAPEX2-4R
                                         (SEQ ID NO: 15)
rCrUrArUrCrGrUrUrGrArGrGrGrUrUrArUrArArCrU sihAPEX2-5F
                                         (SEQ ID NO: 16)
rUrGrArArArUrArGrGrArGrUrUrArUrArArCrCrCrU sihAPEX2-5R
                                         (SEQ ID NO: 17)
rGrGrUrUrArUrArArCrUrCrCrUrArUrUrUrCrArGrC sihAPEX2-6F
                                         (SEQ ID NO: 18)
rUrArArArCrUrCrArUrCrCrArUrGrUrUrUrCrCrArU sihAPEX2-6R
                                         (SEQ ID NO: 19)
rGrGrArArArCrArUrGrGrArUrGrArGrUrUrUrArC sihAPEX2-7F
                                         (SEQ ID NO: 20)
rUrCrArUrCrUrUrUrGrGrCrUrUrCrUrGrArArGrUrC sihAPEX2-7R
                                         (SEQ ID NO: 21)
rCrUrUrCrArGrArArGrCrCrArArArGrArUrGrArGrA sihAPEX2-8F
                                         (SEQ ID NO: 22)
rArGrArArUrGrArGrGrUrCrCrGrUrArArCrUrCrCrU sihAPEX2-8R
                                         (SEQ ID NO: 23)
rGrArGrUrUrArCrGrGrArCrCrUrCrArUrUrCrUrGrG
```

Small Molecule Inhibitors of APE2:

In certain embodiments, small molecular inhibitors are employed such as, for example: Acadesine, AZD3514, CP-335963, Dasatinib, CNX-774, Calmidazolium chloride, NU7441 (KU-57788), DL-Thiorphan, GSK1292263, AZD1080, Thioperamide maleate, AEG 3482, Baricitinib (LY3009104, INCB02805), Tofacitinib (CP-690550) Citrate, S-Ruxolitinib (INCB018424), Phenelzine sulfate, Chloramphenicol, A-205804, Trichlormethiazide, Salinomycin, Sulindac, Domiphen Bromide, Erdosteine, Monobenzone, Thiabendazole, 6(5H)-Phenanthridlnone, Tadalafil, Tetradecylthioacetic acid, AC-93253 Iodide, Protriptyline hydrochloride, Pomalidomide, and BMS-193885.

The APE2 inhibiting agents recited herein may be formulated in pharmaceutical formulations and/or medicaments. For example, for injection, the pharmaceutical formulation and/or medicament may be a powder suitable for reconstitution (e.g., at a hospital or pharmacy) with an appropriate solution (e.g., IV solution, such as Lactated Ringers solution). Examples of these include, but are not limited to, freeze dried, rotary dried or spray dried powders, amorphous powders, granules, precipitates, or particulates. For injection, the formulations may optionally contain stabilizers, pH modifiers, surfactants, bioavailability modifiers and combinations of these. In certain embodiments, the APE2 inhibiting agents are mixed with an organic polar solvent. In certain embodiments, the APE2 inhibiting agents are mixed with a buffer (e.g., phosphate buffered saline).

In certain embodiments, the pharmaceutical formulations with the APE2 inhibiting agents are administered orally, in the form of a pill capsule, gel-cap, or the like. In some embodiments, the oral administration is 1-1500 mg of APE2 inhibiting agents per kilogram of subject (e.g., 1 . . . 10 . . . 75 . . . 100 . . . 125 . . . 150 . . . 200 . . . 250 . . . 300 . . . 400 . . . 500 . . . 650 . . . 800 . . . 1000 . . . 1500 mg/kg). In certain embodiments, provided herein are pills or capsules containing a APE2 inhibiting agent. In particular embodiments, the pills or capsules (e.g., softgels) have an enteric coating.

Dosage forms for the topical (including buccal and sublingual) or transdermal or oral administration of APE2 inhibiting agents of the invention include powders, sprays, pills, gel-caps, ointments, pastes, creams, lotions, gels, solutions, and patches. The APE2 inhibiting agent herein may be mixed under sterile conditions with a pharmaceutically-acceptable carrier or excipient, and with any preservatives, or buffers, which may be required. Powders and sprays can be prepared, for example, with excipients such as lactose, talc, silicic acid, aluminum hydroxide, calcium silicates and polyamide powder, or mixtures of these substances. The ointments, pastes, creams and gels may also contain excipients such as animal and vegetable fats, oils, waxes, paraffins, starch, tragacanth, cellulose derivatives, polyethylene glycols, silicones, bentonites, silicic acid, talc and zinc oxide, or mixtures thereof.

In certain embodiments, the pill or capsule herein comprises a gelatin encapsulated dosage form (e.g., a softgel). In certain embodiments, the gelatin encapsulation of the agent herein is composed of gelatin, glycerin, water, and optionally caramel. In particular embodiments, the pills and capsules herein are coated with an enteric coating (e.g., to avoid the acid environment of the stomach, and release most of the agent in the small intestines of a subject). In some embodiments, the enteric coating comprises a polymer barrier that prevents its dissolution or disintegration in the gastric environment, thus allowing the APE2 inhibiting agent herein to reach the small intestines. Examples of enteric coatings include, but are not limited to, Methyl acrylate-methacrylic acid copolymers; Cellulose acetate phthalate (CAP); Cellulose acetate succinate; Hydroxypropyl methyl cellulose phthalate; Hydroxypropyl methyl cellulose acetate succinate (hypromellose acetate succinate); Polyvinyl acetate phthalate (PVAP); Methyl methacrylate-methacrylic acid copolymers; Shellac; Cellulose acetate trimellitate; Sodium alginate; Zein; COLORCON, and an enteric coating aqueous solution (ethylcellulose, medium chain triglycerides [coconut], oleic acid, sodium alginate, stearic acid) (e.g., coated softgels). Additional enteric coatings are described in Hussan et al., IOSR Journal of Pharmacy, e-ISSN: 2250-3013, p-ISSN: 2319-4219, Volume 2 Issue 6, November-December 2012, PP. 05-11, herein incorporated by references in its entirety, and particularly for its description of enteric coatings.

Suitable pharmaceutical formulations for inhalation include solutions, sprays, dry powders, or aerosols containing any appropriate solvents and optionally other compounds such as, but not limited to, stabilizers, antimicrobial agents, antioxidants, pH modifiers, surfactants, bioavailability modifiers and combinations of these. Formulations for inhalation administration contain as excipients, for example, lactose, polyoxyethylene-9-lauryl ether, glycocholate and deoxycholate. Aqueous and nonaqueous aerosols are typically used for delivery of the agents herein by inhalation.

Ordinarily, an aqueous aerosol is made by formulating an aqueous solution or suspension of the APE2 inhibiting agents together with conventional pharmaceutically acceptable carriers and stabilizers. The carriers and stabilizers vary with the requirements of the particular compound, but typically include nonionic surfactants (e.g., TWEENs, Pluronics, or polyethylene glycol), innocuous proteins like serum albumin, sorbitan esters, oleic acid, lecithin, amino acids such as glycine, buffers, salts, sugars or sugar alcohols. Aerosols generally are prepared from isotonic solutions. A nonaqueous suspension (e.g., in a fluorocarbon propellant) can also be used to deliver the agents of the invention.

Aerosols containing APE2 inhibiting agents for use according to the present invention are conveniently delivered using an inhaler, atomizer, pressurized pack or a nebulizer and a suitable propellant, e.g., without limitation, pressurized dichlorodifluoromethane, trichlorofluoromethane, dichlorotetrafluoroethane, nitrogen, air, or carbon dioxide. In the case of a pressurized aerosol, the dosage unit may be controlled by providing a valve to deliver a metered amount. Capsules and cartridges of, for example, gelatin for use in an inhaler or insufflator may be formulated containing a powder mix of the APE2-inhibiting agents and a suitable powder base such as lactose or starch. Delivery of aerosols of the present invention using sonic nebulizers is advantageous because nebulizers minimize exposure of the agent to shear, which can result in degradation of the compound.

For nasal administration, the pharmaceutical formulations and medicaments with the APE-increasing agents may be a spray, nasal drops or aerosol containing an appropriate solvent(s) and optionally other compounds such as, but not limited to, stabilizers, antimicrobial agents, antioxidants, pH modifiers, surfactants, bioavailability modifiers and combinations of these. For administration in the form of nasal drops, the agent maybe formulated in oily solutions or as a gel. For administration of nasal aerosol, any suitable propellant may be used including compressed air, nitrogen, carbon dioxide, or a hydrocarbon based low boiling solvent.

Transdermal patches may be employed herein, and have the added advantage of providing controlled delivery of a compound of the invention to the body. Such dosage forms can be made by dissolving or dispersing the agent in the proper medium. Absorption enhancers can also be used to increase the flux of the agent across the skin. The rate of such flux can be controlled by either providing a rate controlling membrane or dispersing the compound in a polymer matrix or gel.

Besides those representative dosage forms described above, pharmaceutically acceptable excipients and carriers are generally known to those skilled in the art and are thus included in the instant invention. Such excipients and carriers are described, for example, in "Remingtons Pharmaceutical Sciences" Mack Pub. Co., New Jersey (1991), which is incorporated herein by reference.

Specific dosages of the APE2 inhibiting agent herein may be adjusted depending on conditions of disease, the age, body weight, general health conditions, sex, and diet of the subject, dose intervals, administration routes, excretion rate, and combinations of drugs. Any of the above dosage forms containing effective amounts are well within the bounds of routine experimentation and therefore, well within the scope of the instant invention.

In certain embodiments, the APE2 inhibiting agent herein are administered in a cycle of less than about 3 weeks, about once every two weeks, about once every 10 days or about once every week or once per day. One cycle can comprise the administration of an agent herein and optionally a second active agent (e.g., Cisplatin or other APE2 upregulating drug) by infusion over about 90 minutes every cycle, about 1 hour every cycle, about 45 minutes every cycle, about 30 minutes every cycle or about 15 minutes every cycle. Each cycle can comprise at least 1 week of rest, at least 2 weeks of rest, at least 3 weeks of rest. The number of cycles administered is from about 1 to about 12 cycles, more typically from about 2 to about 10 cycles, and more typically from about 2 to about 8 cycles.

In particular embodiments, courses of treatment can be administered concurrently to a subject, i.e., individual doses of the APE2 inhibiting agent herein and secondary therapeutic are administered separately yet within a time interval such that the agent herein can work together with the additional therapeutic agent. For example, one component can be administered once per week in combination with the other components that can be administered once every two weeks or once every three weeks. In other words, the dosing regimens are carried out concurrently even if the therapeutics are not administered simultaneously or during the same day.

EXAMPLE

Example 1

Cisplatin-Mediated Upregulation of APE2 Binding to MYH9 Provokes Mitochondrial Fragmentation and Acute Kidney Injury Cisplatin chemotherapy is standard care for many cancers but is toxic to the kidneys. In this example, we identified apurinic/apyrimidinic endonuclease 2 (APE2) as a critical molecule upregulated in the proximal tubule cells (PTC) following cisplatin-induced nuclear DNA and mitochondrial DNA damage in cisplatin-treated C57B6J mice. The APE2 transgenic mouse phenotype recapitulated the pathophysiological features of C-AKI (acute kidney injury, AKI) in the absence of cisplatin treatment. APE2 pulldown-MS analysis revealed that APE2 binds myosin heavy-Chain 9 (MYH9) protein in mitochondria after cisplatin treatment. Human MYH9-related disorder is caused by mutations in MYH9 that eventually lead to nephritis, macrothrombocytopenia, and deafness, a constellation of symptoms similar to the toxicity profile of cisplatin. Moreover, cisplatin-induced C-AKI was attenuated in APE2-knockout mice. Taken together, these findings suggest that cisplatin promotes AKI development by upregulating APE2, which leads to subsequent MYH9 dysfunction in PTC mitochondria due to an unrelated role of APE2 in DNA damage repair.

Materials and Methods

Mice

Ten-week-old wild-type C57BL/6J mice weighing 25-28 g were purchased from the Jackson Laboratory. Mice were treated with a single intraperitoneal dose of cisplatin (15 mg/kg body weight, 1 mg/mL in 0.9% NaCl), carboplatin (40 mg/kg body weight, 2 mg/mL in 0.9% NaCl) or oxaliplatin (40 mg/kg body weight, 2 mg/mL in 0.9% NaCl). An identical volume of saline (0.9% NaCl) was administered intraperitoneally to control mice. APE2 KO mice and C57BL/6J wild-type mice received a single intraperitoneal dose of freshly dissolved cisplatin in saline (15 mg/kg body weight, 1 mg/mL in 0.9% NaCl; Sigma).

APE2 conditional transgenic mice were generated by inserting a transcription-translation STOP cassette flanked by LoxP sites (LSL) at the start of the APE2 locus. An FRT-mediated recombination ColA1 3' untranslated region locus was used first to generate APE2LSL mice. The STOP cassette prevents expression of the APE2 gene. To remove the STOP cassette and activate APE2 expression in vivo, the APE2LSL mice were mated with Rosa26-Cre-Estrogen Receptor-T2 (CreERT2+/−) mice (18; #8463, The Jackson Laboratory), in which the ERT moiety retains Cre recombinase activity in the cytoplasm until tamoxifen administration releases this block and promotes recombination of genomic LoxP sites. Three-week-old APE2LSL/+CreERT2+/− mice and CreERT2+/− mice were injected intraperitoneally with 10 mg/kg 4-OH-tamoxifen for 3 consecutive days. Creatinine and EPO were measured using mouse creatinine (Crystal Chem) and EPO (R&D Systems) ELISA kits. We used heterozygous male (APE2−/Y) mice (12) bearing a mutated APE2 allele on the X chromosome, in which a genomic region from the 3'-region of its intron 5 to the 5'-region in exon 6 was replaced by a neo cassette by crossing heterozygous APE2 female (APE2−/+) mice with wild-type C57BL/6 mice. We did not use female APE2 knockout (APE2−/−) mice because this can only be accomplished by crossing male APE2 knockout (APE2−/Y) with heterozygous APE2 female (APE2−/+) mice. Using this breeding strategy, there is the potential risk and uncertainty of interference with the germline DNA in the male and female APE2 knockout progeny because APE2 has already been knocked out in the male parent (APE2−/Y) and because the function of APE2 is to be responsible for DNA damage repair (13). All mice were of C57B6 genetic background. All experiments involving animals were pre-approved by the Cleveland Clinic IACUC (Institutional Animal Care and Use Committee).

Patient Tissue Preparation

Kidney specimens were obtained from healthy donors and from cisplatin-induced AKI patients in accordance with Cleveland Clinic Foundation Institutional Review Board approval requirements, and written informed consent was obtained in compliance with the Helsinki.

Cells

HEK293T and HK2 cells were purchased from the ATCC. Mouse anti-Prominin-1 MicroBeads (130-092-333, Miltenyi Biotec) were used to isolate PTCs from APE2LSL/− Cre-ERT2+/− mice, Cre-ERT2+/− mice, C57B6 mice, and APE2 KO mice. The primary PTCs were cultured in DMEM/Nutrient Mixture F-12 (DMEM/F12) containing 10% FBS, 100 U/mL penicillin, and 100 µg/mL streptomycin. HEK293T and HK2 cells were routinely genotyped using the Human Cell Line Genotyping System (Promega) and were used within their 6 times passage. Mouse PTCs were genotyped using the primer for transgenic mice and were used within their 3 times passage. All cell lines were used *Mycoplasma* tested negative.

Real-Time Cell Growth Assay

To determine the effect of APE2 on PTC growth, PTCs from APE2LSL/−CreERT2+/− mice and Cre-ERT2+/− mice were seeded into 12-well plates. Cell growth was assessed using an IncuCyte ZOOM live-cell image monitoring system for 4 days (Essen BioScience).

Immunoprecipitation of APE2-Binding Proteins

PMEV-3FLAG-hAPE2 plasmid was constructed by using hAPE2 cDNA cloned into PMEV-3FLAG-empty vector, and HEK293T cells were transfected with the plasmid. Flag tag antibody was then used to pull down APE2-binding proteins. Anti-IgG was used as control.

Pulldown samples were run on SDS-PAGE gels. The bands from the gel were cut out, washed/de-stained in 50% ethanol containing 5% acetic acid, dehydrated in acetonitrile, reduced with dithiothreitol, and alkylated with iodoacetamide before digestion. All bands were completely digested in-gel by using trypsin 5 μL (10 ng/μL) in 50 mmol/L ammonium bicarbonate and incubating overnight at room temperature. Peptides were extracted from the polyacrylamide in two aliquots of 30 μL 50% acetonitrile containing 5% formic acid. The extracts were combined and evaporated to <10 μL in a Speedvac and then resuspended in 1% acetic acid to make up a final volume of approximately 30 μL for LC-MS analysis.

Mass Spectrometry

The LC-MS system was a LTQ-Obitrap Elite hybrid mass spectrometer system (Thermo Fisher Scientific) and a Dionex 15 cm×75 mol/L id Acclaim Pepmap C18, 2 μm, 100 Å reversed-phase capillary chromatography column. Extracts were injected in 5 μL volumes, and the peptides were eluted with an acetonitrile/0.1% formic acid gradient at a flow rate of 0.25 L/min introduced into the mass spectrometer source. The microelectrospray ion-source was operated at 2.5 kV. The digest was analyzed using the data-dependent multi-task capability of the instrument, acquiring full-scan mass spectra in the Orbitrap at a resolution of 60,000 to determine peptide molecular weights and production spectra in the ion trap to enable determination of the amino acid sequence in sequential scans. Data were analyzed by using all the collected CID spectra and searching the NCBI human reference sequence database (March 2015, with 99,739 entries) with the search programs Mascot (version 2.3.0) and SEQUEST (version 2.2). The data were uploaded into Scaffold (version 4.0) for protein and peptide validation. To identify proteins, a threshold of at least five CID spectra (spectral counts) was set; the proteins identified in APE2 pull-down/control pull-down samples at a level greater than 2.5-fold were collected by filtration and marked as APE2-binding proteins for further analysis.

Immunofluorescence Staining

Immunofluorescence staining was performed as described previously (20). The slides of HK2 cells were incubated sequentially with rabbit anti-APE2 antibody (GeneTex), goat anti-rabbit Alexa Fluor 488-conjugated secondary antibody (Abcam), mouse anti-MYH9 antibody (GeneTex), goat anti-mouse Alexa Fluor 647-conjugated secondary antibody (Abcam), and rabbit anti-COXIV antibody Alexa Fluor 5469-conjugated antibody (Santa Cruz Biotechnology). For immunofluorescence staining of PTCs from transgenic mice, slides of mouse PTCs were incubated sequentially with rabbit anti-APE2 antibody (kindly provided by Dr. Y. Nakabeppu) and goat anti-rabbit Alexa Fluor 488-conjugated secondary antibody (Abcam); human anti-MYH9 antibody (GeneTex) and goat anti-human Alexa Fluor 546-conjugated secondary antibody (Abcam); rabbit anti-COXIV Alexa Fluor 647-conjugated antibody (Santa Cruz Biotechnology). Images were captured by confocal microscopy (Leica TCS SP8) at ×630 magnification.

Oxygen Consumption Assay

The functional activity of PTC mitochondria was measured by using a Seahorse XF24 Analyzer and a Seahorse XF Cell Mito Stress Test Assay (Agilent Technologies). Mitochondrial functionality was examined by direct measurement of the OCR of cells according to the manufacturer's instructions. Briefly, $8 \times 10^4$ PTCs were seeded into 24-well plates and allowed to attach overnight. The cells were subjected to OCR detection by sequential injections of oligomycin, carbonyl cyanide p-trifluoromethoxyphenylhydrazone (FCCP), and a combination of rotenone and antimycin A. Basal OCR=measured OCR level before the injection of oligomycin. Adenosine triphosphate (ATP) synthesis-linked OCR (ATP-linked)=basal OCR−OCR following oligomycin injection. Maximum OCR=OCR following the injection of FCCP. Reserve respiration (Reserve resp) =maximum respiration−basal OCR. Proton leak-linked OCR=uncoupled OCR following oligomycin-nonmitochondrial OCR following injection of rotenone and antimycin A. Nonmitochondrial OCR (Non-mito)=OCR following the injection of rotenone and antimycin A.

IHC

Formalin-fixed paraffin-embedded tissue sections were de-paraffinized and then incubated with rabbit anti-APE2 polyclonal antibody (Bioss, bs-6587R), rabbit anti-cleaved caspase-3 monoclonal antibody (Cell Signaling Technology, #9664S), rabbit anti-MYH9 antibody (GeneTex GTX113236), or rabbit anti-phosphor-histone H2A.X (Ser139) polyclonal antibody (Cell Signaling Technology, #2577) at 4° C. overnight. After incubation with horseradish peroxidase (HRP)-conjugated goat anti-rabbit secondary antibody, signal was detected using a DAB Substrate kit (Abcam, ab64238) according the manufacturer's instructions. Images were obtained by means of a phase-contrast microscope (Leica DM2000 LED) and a digital camera (Leica DMC 2900).

Immunoblotting

Total protein samples were isolated with RIPA buffer, fractionated on 4%-12% Bis-Tris polyacrylamide gels (Thermo Fisher Scientific), and electroblotted onto PVDF membranes (Millipore). Membranes were blocked with 5% nonfat milk and incubated overnight with rabbit anti-APE2 polyclonal antibody (Bioss, #bs-6587R), rabbit anti-APE1 polyclonal antibody (Abnova, #H00000328-D02), mouse anti-LIG3 monoclonal antibody (Santa Cruz Biotechnology, #sc-56089), rabbit anti-MRE11 monoclonal antibody (Cell Signaling Technology, #4847), rabbit anti-CtIP polyclonal antibody (Bethyl Laboratories, #300-488A), or goat anti-β-actin polyclonal antibody (Santa Cruz Biotechnology, #sc-1615) overnight at 4° C. Membranes were then washed and incubated with HRP-linked anti-rabbit IgG secondary antibody (Cell Signaling Technology, #7074) or HRP-linked anti-mouse IgG secondary antibody (Cell Signaling Technology, #7076S). The specific protein-antibody complex was detected with HRP-conjugated rabbit anti-mouse IgG. Detection by chemiluminescence was carried out by means of a SuperSignal West Femto Maximum Sensitivity Substrate kit (Thermo Fisher Scientific) with β-actin as a loading control.

Transmission Electron Microscopy Analysis

Mouse kidney biopsy specimens were submerged in 2.5% EM grade glutaraldehyde in 2.5% glutaraldehyde/4% paraformaldehyde in 0.2 mol/L sodium cacodylate buffer (pH 7.4) at 4° C. immediately after sectioning and fixed at 4° C. overnight. After washing three times for 5 minutes in sodium cacodylate buffer (0.2 mol/L, pH 7.3), kidney fragments were fixed in 1% aqueous osmium tetroxide for 60 minutes at 4° C., then washed twice for 5 minutes with sodium cacodylate buffer and rinsed once with maleate buffer (pH 5.1, 5 minutes). After changing to 1% uranyl acetate in maleate buffer, the samples were stained for 60 minutes; the uranyl acetate was removed. The samples were then washed three times for 5 minutes with maleate buffer and then dehydrated with ascending grades of ethanol, and finally embedded in Epon resin (Electron Microscopy Science). Ultrathin sections (85 nm) were cut by means of an EM UC7 ultramicrotome (Leica Microsystems), then successively stained with uranyl acetate and lead citrate, and examined with a transmission electron microscopy (TEM) instrument at 80 kV (Tecnai G2 SpiritBT, FEI).

Immunoelectron Microscopy

Mouse kidney biopsy specimens from control and transgenic mice were fixed 4% PFA with 0.05% glutaraldehyde overnight at 4° C. and then subjected to dehydration in 30% to 100% ethanol for 10 minutes at room temperature. The tissues were treated with 1:1 100% ethanol:LR white resin overnight, 100% LR white resin at 6 hours, and then re-embedded with LR white resin at 50° C. to complete the polymerization. Ultrathin sections were sliced with a diamond knife (90-nm thickness) and mounted on nickel grids coated with formvar. The mounted grids were each washed three times with PBS for 5 minutes and then blocked with PBS containing 1% BSA for 30 minutes at room temperature. Diluted rabbit anti-mouse APE2 antibody (refs. 12, 19) at 1:50 dilution and human anti mouse MYH9 antibody (#33939, GeneTex) at 1:100 dilution in PBS with 1% BSA were added and incubation was performed overnight at 4° C. The grids were washed with PBS three times for 5 minutes each and then blocked with 0.1% BSA in PBS for 10 minutes at room temperature. Diluted 5-nm gold-conjugated anti-rabbit IgG and 15-nm gold-conjugated anti-human IgG with 0.1% BSA in PBS (1:10 dilution), then added to each grid a 30 L drop of GAM for 60 minutes at room temperature and the grid was then washed with PBS three times (5 minutes per wash). The antibodies were fixed for 10 min with 1% glutaraldehyde in PBS. After being washed with water three times (5 minutes per wash), the grids were stained with UA and lead citrate. After air dried, the grids were observed with a Tecnai G2 SpiritBT electron microscope operated at 80 kV.

Statistical Analysis

A two-tailed student t test was performed using SPSS (version 17.0) to compare independent pairs of groups. In our mouse model, the time to death was determined by the Kaplan-Meier method, with Cox proportional hazard regression analysis for group comparisons. A P value of ≤0.05 was statistically significant.

Results

APE2 is upregulated in response to cisplatin-induced mtDNA damage

The majority of kidney cisplatin toxicity studies in rodents found marked histological changes, including proximal and distal tubular necrosis and glomerular toxicity, which are the clinical features of C-AKI disease in humans. We found as a prelude to the present work that mice treated with cisplatin (15 mg/kg) developed proximal and distal tubular necrosis and glomerular toxicity as described in the literature (21). Analysis of BER pathway protein expression in cisplatin-treated mouse kidney revealed that APE2 is the most highly upregulated protein (FIG. 1A), whereas APE1, LIG3, MRE11, and CTIP are slightly upregulated and PCNA is downregulated. APE2 is a key player in repair of mtDNA damage (15, 22). Because the ability of cisplatin to induce nuclear DNA damage per se is not sufficient to explain its toxic effects in post-mitotic normal tissues, we believe that upregulated APE2 may be responsible for cytotoxicity in PTCs. Carboplatin and oxaliplatin, are thought to be less nephrotoxic than cisplatin because they lack chloride atoms and display decreased organic cation transporter-2 (OCT-2) cellular uptake in PTCs than in other types of cells. When we treated mice with carboplatin and oxaliplatin a slight upregulation of APE2 in kidney cells was observed. In the clinic, cisplatin-induced AKI is much more common than carboplatin and oxaliplatin but very few patients are likely to be biopsied. We studied APE2 expression in two patients with C-AKI using IHC staining for APE2 and found the protein to be dramatically upregulated in their PTCs in comparison with their biopsied normal kidneys (FIG. 1).

APE2 Transgenic Mouse Model

Figure 2:
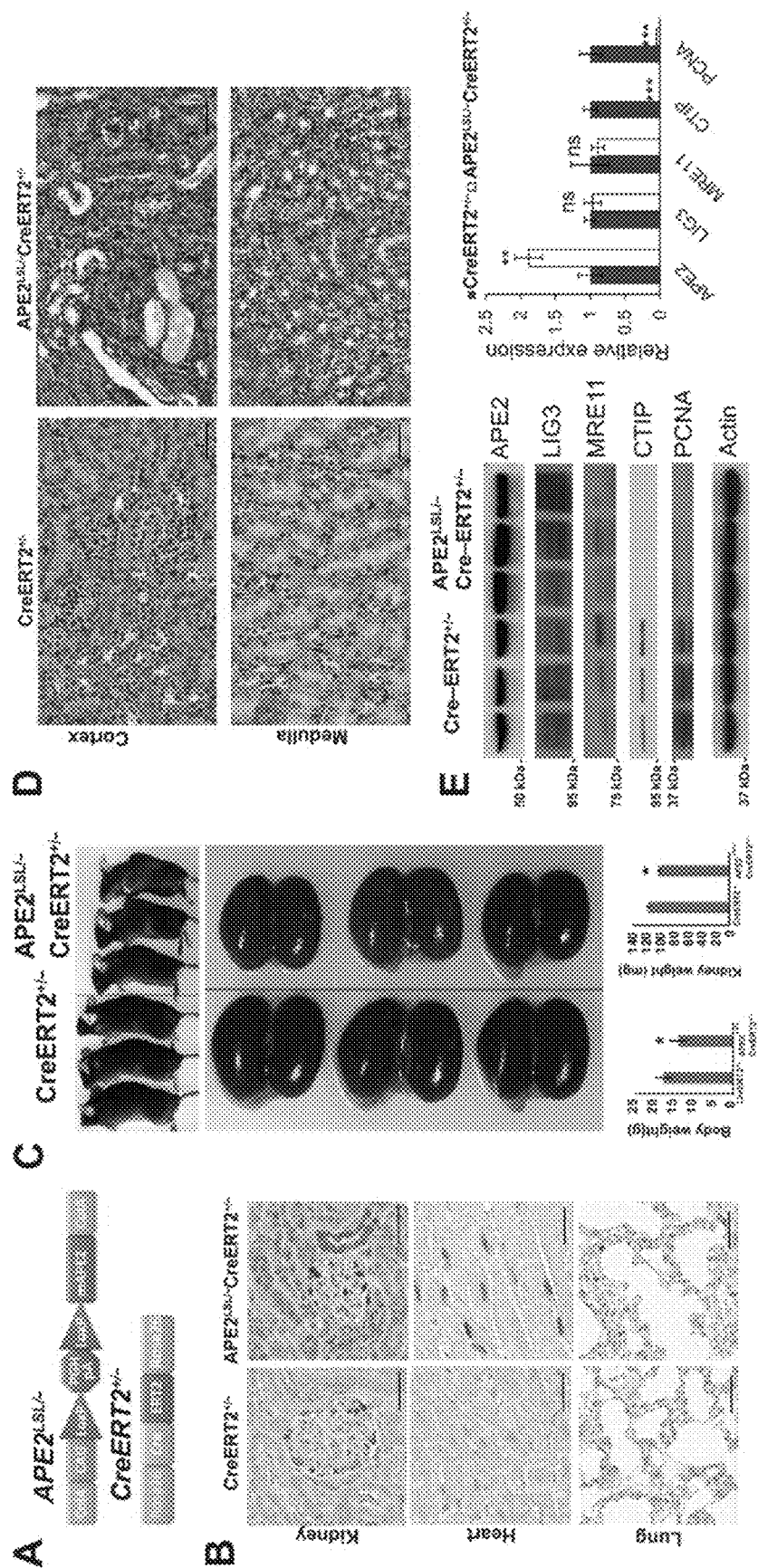
FIG. 2. APE2 conditional transgenic mouse model. A, Schematic representation of APE2 in a conditional transgenic mouse. B, Representative image of APE2 IHC staining from kidney, heart, and lung of CreERT2$^{+/-}$ control mice (n=3) and APE2$^{LSL/+}$ CreERT2$^{+/-}$ transgenic mice (n=3) indicating successful cre-induced LoxP recombination and subsequent APE2 overexpression. Scale bar, 100 μm. C, Five-week-old CreERT2$^{+/-}$ control (n=3) and APE2$^{LSL/+}$ CreERT2$^{+/-}$ transgenic mice (n=3) and kidneys after 4-OH tamoxifen treatment at 3 weeks of age. *, $P<0.05$. D, Representative image of hematoxylin and eosin staining of CreERT2$^{+/-}$ control and APE2$^{LSL/+}$ CreERT2$^{+/-}$ transgenic mouse kidney cortex and medulla (n=3). Scale bar, 100 μm. E, Western blot results for kidney protein expression of APE2, LIG3, MRE11, CTIP, PCNA, and actin in CreERT2$^{+/-}$ control mice (n=3) and APE2$^{LSL/-}$ CreERT2$^{+/-}$ transgenic mice (n=3). ns, not significant; , $P<0.01$; *, $P<0.001$.

To determine whether C-AKI develops in mice as a consequence of cisplatin-mediated effects via APE2 overexpression, we generated APE2 conditional transgenic mice (FIG. 2A). To mimic the effect of cisplatin in all organs, we crossed APE2LSL/− mice with CreERT2+/− mice, in which Cre-induced expression of APE2 is controlled by the CAG promoter, a well-established strategy for generating transgenic mice with high expression of APE2 in nearly all organs after tamoxifen administration (FIG. 2B; ref. 18). We then evaluated the APE2LSL/−CreERT2+/− mice for the development of typical cisplatin treatment-related pathology. Two weeks after tamoxifen-induced transgene expression, body and kidney weight in 5-week-old APE2LSL/− CreERT2+/− mice were reduced to a remarkable degree (FIGS. 2C and D). We observed C-AKI-like pathologic features (FIG. 2D) in APE2LSL/− CreERT2+/− mice. In molecular level, we observed similar changes as in C-AKI mice (FIG. 1A) except that CTIP expression was lower in APE2LSL/− CreERT2+/− mice as compared with CreERT2+/− control mice (FIG. 2E).

Figure 3:
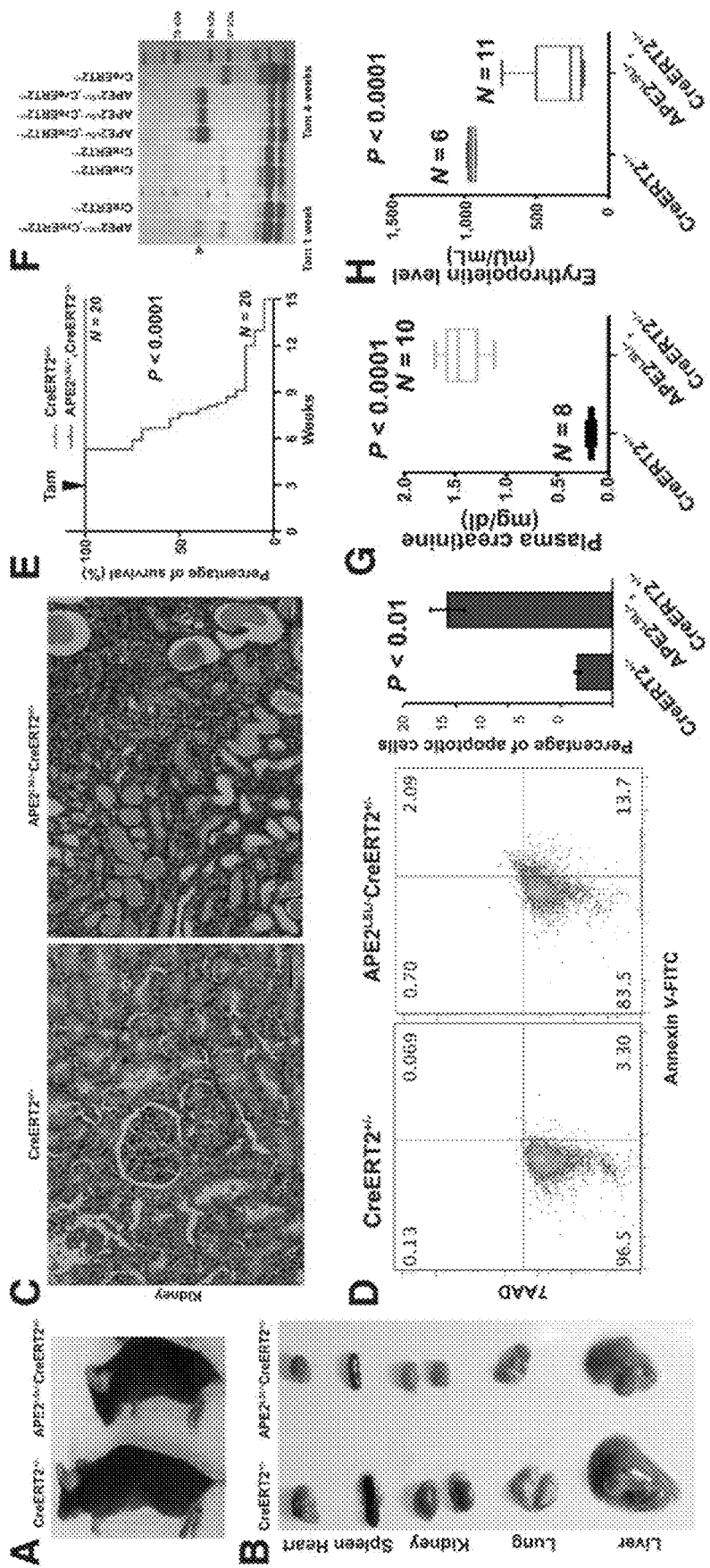
FIG. 3. Clinical features of C-AKI-like disease in APE2 transgenic mice. A, Representative image of body weight loss. B, Changes in major organs. C, Hematoxylin and eosin staining of kidney. Scale bar, 100 μm. Note that cortical tubules are dilated, with diminishment of their brush border, and that necrosis is present in the APE2$^{LSL/-}$ CreERT2$^{+/-}$ kidney, and that the lumens contain necrotic cellular debris and albumin. D, Flow cytometric analysis of apoptotic renal PTCs isolated from 8-week-old APE2$^{LSL/-}$ CreERT2$^{+/-}$ mice (n=3) and control CreERT2$^{+/-}$ mice (n=3); 4-OH tamoxifen (tam) was injected into all mice at 3 weeks of age. E, Survival curve of aging APE2$^{LSL/-}$ CreERT2$^{+/-}$ mice (n=20, male/female=10/10) and control CreERT2$^{+/-}$ mice (n=20, male/female=10/10). F, Urine albumin. G, Plasma creatinine. H, EPO level from 8-week-old APE2$^{LSL/-}$ CreERT2$^{+/-}$ mice and control CreERT2$^{+/-}$ mice; 4-OH tamoxifen (tam) was administered to all mice at 3 weeks of age.
Figure 4:
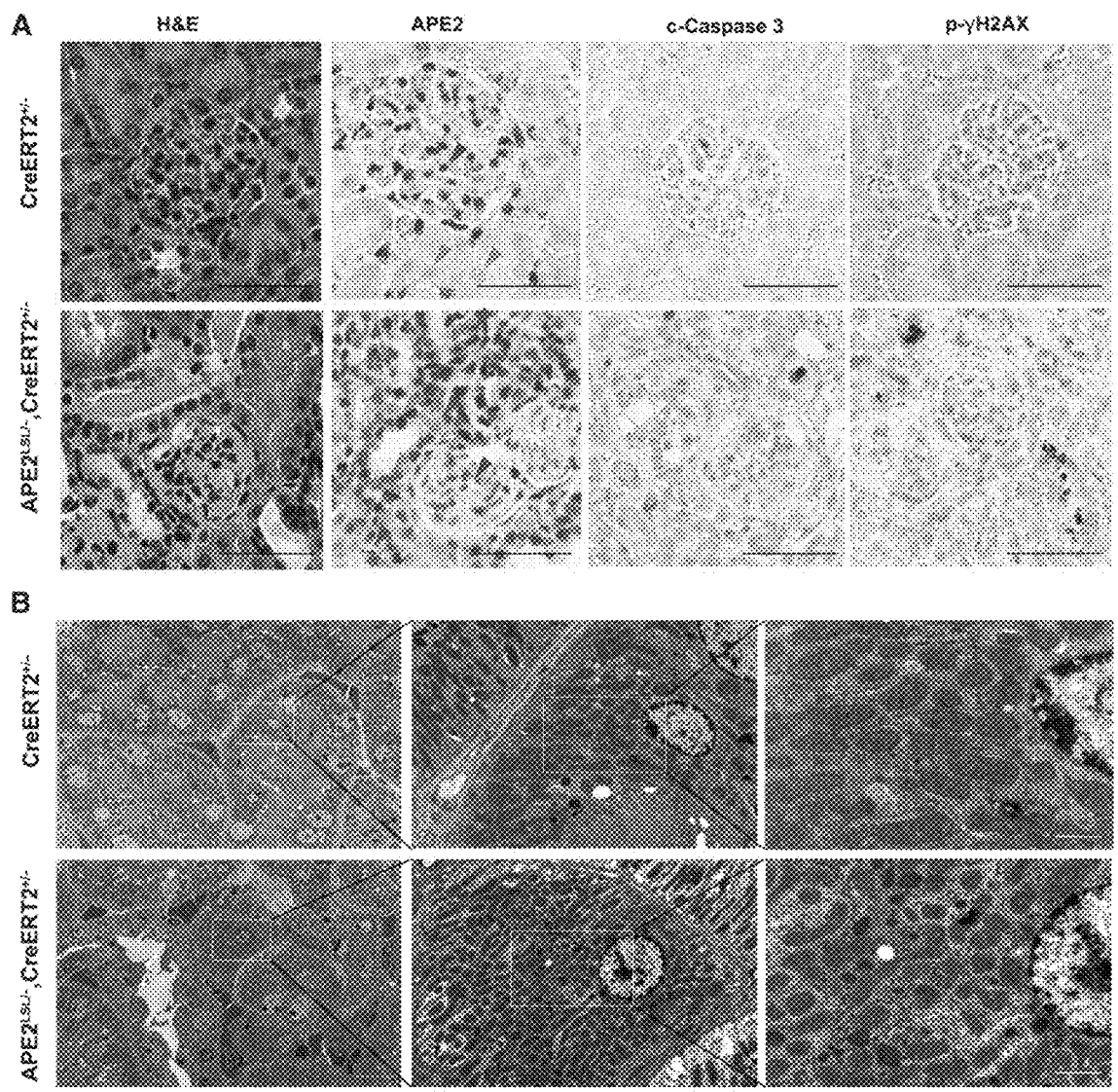
FIG. 4. Mitochondrial fragmentation in APE2 transgenic mice. A, Histology and IHC staining. Scale bar, 100 μm. Green arrow, PTCs; blue arrow, glomerular cells; red arrow, granular enrichment in cytosol of PTCs, B, Representative image of EM of PTCs (green scale bar, 8 μm; red scale bar, 2 μm; yellow, scale bar, 0.8 m) from 8-week-old APE2$^{LSL/-}$ CreERT2$^{+/-}$ mice (n=3) and control CreERT2$^{+/-}$ mice (n=3); tamoxifen (tam) was administered to mice at 3 weeks of age. H&E, hematoxylin and eosin.

APE2 Transgenic Mice Develop C-AI-Like Disease after Pan-Expression of APE2 is Induced With aging, all APE2LSL/− CreERT2+/− mice developed irreversible C-AKI-like disease, weight loss (FIG. 3A), and pale/stiff kidneys (FIG. 3B). Dissection revealed a small, pale (FIG. 3B), and necrotic (FIG. 3C) kidney but no necrotic changes in other organs. Also noted were late-stage C-AKI pathologic features, and ongoing apoptosis in PTCs isolated from APE2LSL/− CreERT2+/− mice kidney (FIG. 3D). All the APE2LSL/− CreERT2+/− mice died of kidney failure at 15 weeks of age, but none of the CreERT2+/− control mice (FIG. 3E) showed these changes or died. More importantly, APE2LSL/− CreERT2+/− mice developed clinical features of C-AKI, including high urine albumin (FIG. 3F) and blood creatinine (FIG. 3G) and decreased EPO (FIG. 3H). Furthermore, at one week after tamoxifen injection, increased urine albumin was seen in APE2LSL/− CreERT2+/− mice but not in CreERT2+/− mice, indicating the kidney injury to be primary rather than secondary, and to be due to some other organ failure (e.g., of the heart or to tamoxifen toxicity). Furthermore, the pathologic features of APE2LSL/− CreERT2+/− mice is known to differ from the renal glomerular disease induced by hypertension or diabetes, mimicking instead C-AKI kidney damage. In the present work, we observed apoptotic PTCs in APE2LSL/− CreERT2+/− mice and DNA damage (FIG. 4A). Electron microscopy revealed marked mitochondrial fragmentation in APE2LSL/− CreERT2+/− mouse PTCs but not in control CreERT2+/− mouse PTCs (FIG. 4B).

Figure 5:
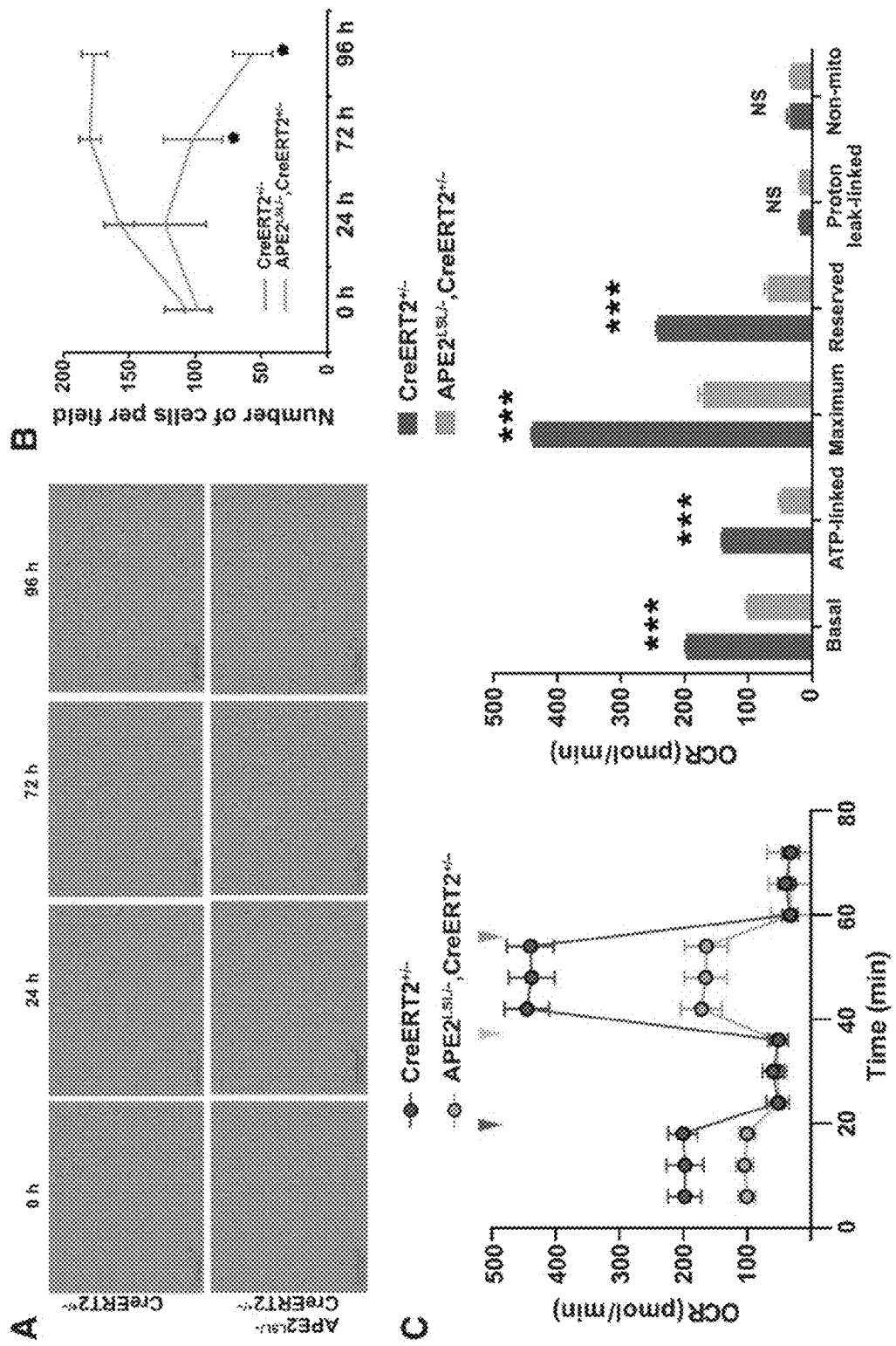
FIG. 5. Cell death and oxygen consumption pattern of APE2 TG mice PTCs after tamoxifen treatment in vitro. A, Representative phase-contrast microscopic image. B, Cell growth curve. C, OCR analysis for APE2$^{LSL/-}$ CreERT2$^{+/-}$ mice (n=3) and control CreERT2$^{+/-}$ mice (n=3). Injections consisted of oligomycin (red arrow), carbonyl cyanide p-trifluoromethoxyphenylhydrazone (FCCP; yellow arrow), or a combination of rotenone and antimycin A (green arrow). NS, not significant; ***, $P<0.001$.

To rule out the possibility of PTC death due to APE-induced microenvironmental dysregulation, we isolated and cultured PTCs from APE2LSL/− CreERT2+/− mice and CreERT2+/− control mice. After we added 4-OH tamoxifen, we found that PTCs from APE2LSL/− CreERT2+/− mice died (FIG. 5A) much faster (FIG. 5B) than those from CreERT2+/− control mice, indicating that APE2 overexpression in PTCs induces cell death directly rather than via secondary changes in the kidney microenvironment. We also found the OCR to be dramatically reduced in the APE2 transgenic mice as compared with control mice (FIG. 5C), pointing to mitochondrial dysfunction induced by overexpression of APE2.

APE2 is enriched in mitochondria and binds to MYH9 upon cisplatin treatment

Figure 6:
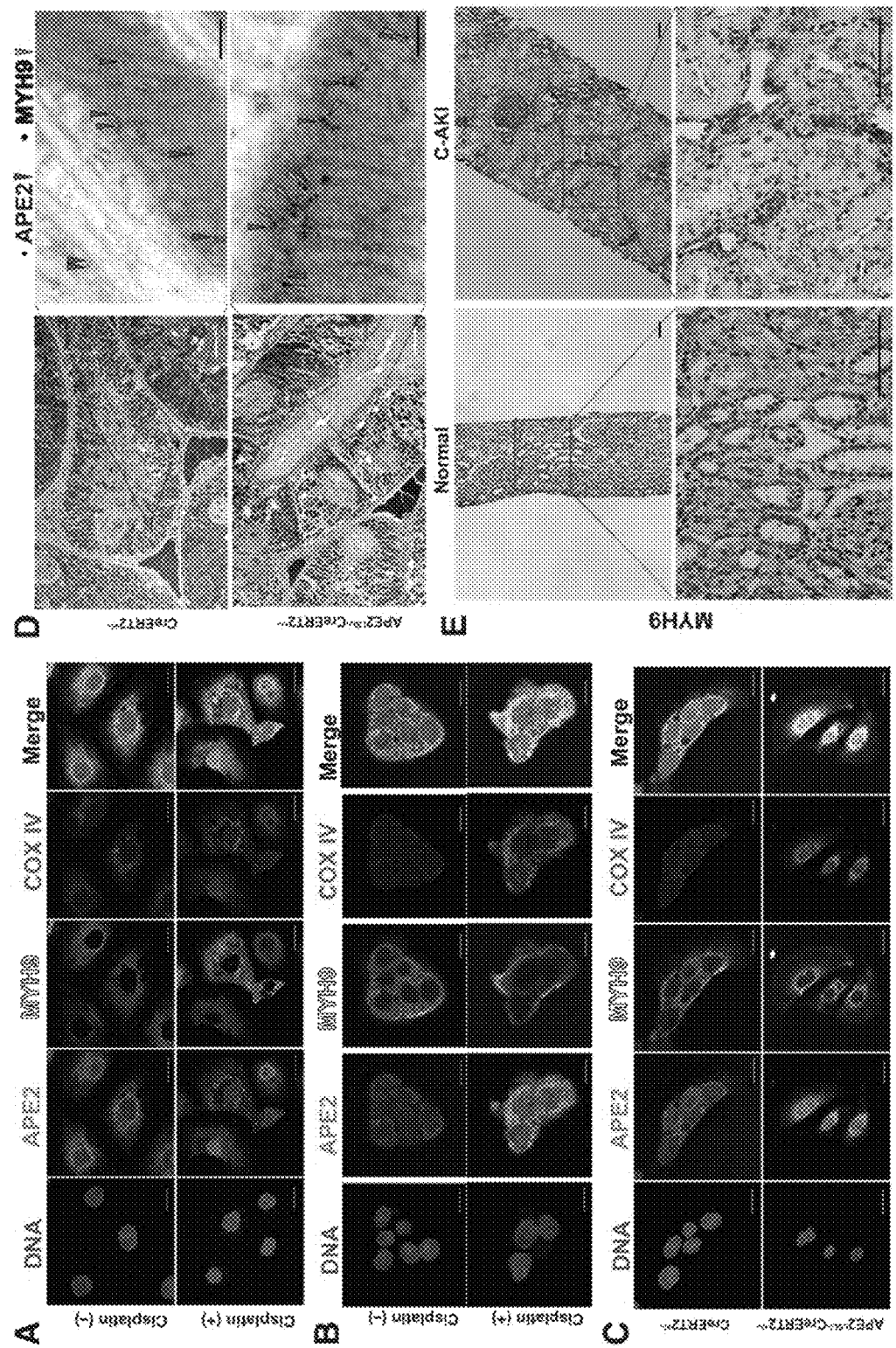
FIG. 6. Cisplatin-induced APE2 enrichment in mitochondria. A, Use of immunofluorescence to identify the subcellular localization of APE2 and MYH9 in HK2 cells after cisplatin treatment. Scale bar, 10 μm. B, Immunofluorescence to detect subcellular APE2 and MYH9 localization in primary mouse PTCs after cisplatin treatment. Scale bar, 10 μm. C, Representative image of immunofluorescence image identifying APE2 and MYH9 subcellular localization in PTCs from APE2$^{LSL/-}$ CreERT2$^{+/-}$ mice and control CreERT2$^{+/-}$ mice. Scale bar, μm. D, Use of immunoelectron microscopy to confirm the colocalization and enrichment of APE2 and MYH9 in the mitochondria of PTCs from APE2$^{LSL/-}$ CreERT2$^{+/-}$ mice and control CreERT2$^{+/-}$ mice. White scale bar, 8 μm; black scale bar, 0.1 μm. E, Representative IHC for visualization of MYH9 in kidney biopsies from healthy donors (n=10) and C-AKI patients (n=2). Scale bar, 100 μm.

To explore the mechanism underlying APE2 induction of AKI disease, we performed an APE2 IP pulldown experiment, followed by liquid chromatography-mass spectrometry (LC-MS) proteomic analysis using Flag-APE2 overexpressed in HEK293T cells. The most abundant APE2 pulldown proteins were found to be MYH9/10/14. Patchy expression of MYH9/10/14 has previously been reported to be ubiquitous in all renal tubule segments and in glomerulus cells (23). We chose to focus on MYH9 protein because only MYH9 knockout and MYH9 R702C-, D1424N-, E1841K- mutated mice develop a phenotype similar to that of APE2 transgenic mice (17). To further explore the subcellular localization pattern of APE2 and MYH9 in PTCs during cisplatin treatment, HK2 and primary mouse PTCs were treated with cisplatin and subjected to immunofluorescence analysis. Immunofluorescence was used to identify the subcellular localization of APE2 and MYH9 in primary mouse PTCs, with COX IV as a mitochondria marker. As shown in FIGS. 6A and B, in control HK2 cells and mouse PTCs, APE2 was localized in both the nucleus and the cytoplasm, and was also partially colocalized with MYH9 in the cytoplasm. When the cells were treated by cisplatin, APE2 was similarly enriched in the cytoplasm, especially within mitochondria.

Cisplatin-induced APE2 enrichment in mitochondria. A, Use of immunofluorescence to identify the subcellular localization of APE2 and MYH9 in HK2 cells after cisplatin treatment. Scale bar, 10 μm. B, Immunofluorescence to detect subcellular APE2 and MYH9 localization in primary mouse PTCs after cisplatin treatment. Scale bar, 10 μm. C, Representative image of immunofluorescence image identifying APE2 and MYH9 subcellular localization in PTCs from APE2LSL/− CreERT2+/− mice and control CreERT2+/− mice. Scale bar, 10 μm. D, Use of immunoelectron microscopy to confirm the colocalization and enrichment of APE2 and MYH9 in the mitochondria of PTCs from APE2LSL/− CreERT2+/− mice and control CreERT2+/− mice. White scale bar, 8 μm; black scale bar, 0.1 μm. E, Representative IHC for visualization of MYH9 in kidney biopsies from healthy donors (n=10) and C-AKI patients (n=2). Scale bar, 100 μm.

In PTCs from CreERT2+/− control mice, APE2 was localized in both the nucleus and the cytoplasm, whereas MYH9 localized only in the cytoplasm (FIG. 6C). APE2 was also partially colocalized with MYH9 in the cytoplasm. When APE2 was ectopically overexpressed in APE2 transgenic mice, it was granularly enriched in the mitochondria without cisplatin treatment, mimicking cisplatin-induced APE2 overexpression and enrichment in mitochondria. Colocalization of APE2 and MYH9 in mouse kidney mitochondria was further confirmed by immunoelectron microscopy. As shown in FIG. 6D, APE2 and MYH9 were colocalized in the mitochondria. Furthermore, we also observed MYH9 enrichment in the cytosol of PTCs from C-AKI patients (FIG. 6E).

APE2 Knockout Compromises C-AKI

Figure 7:
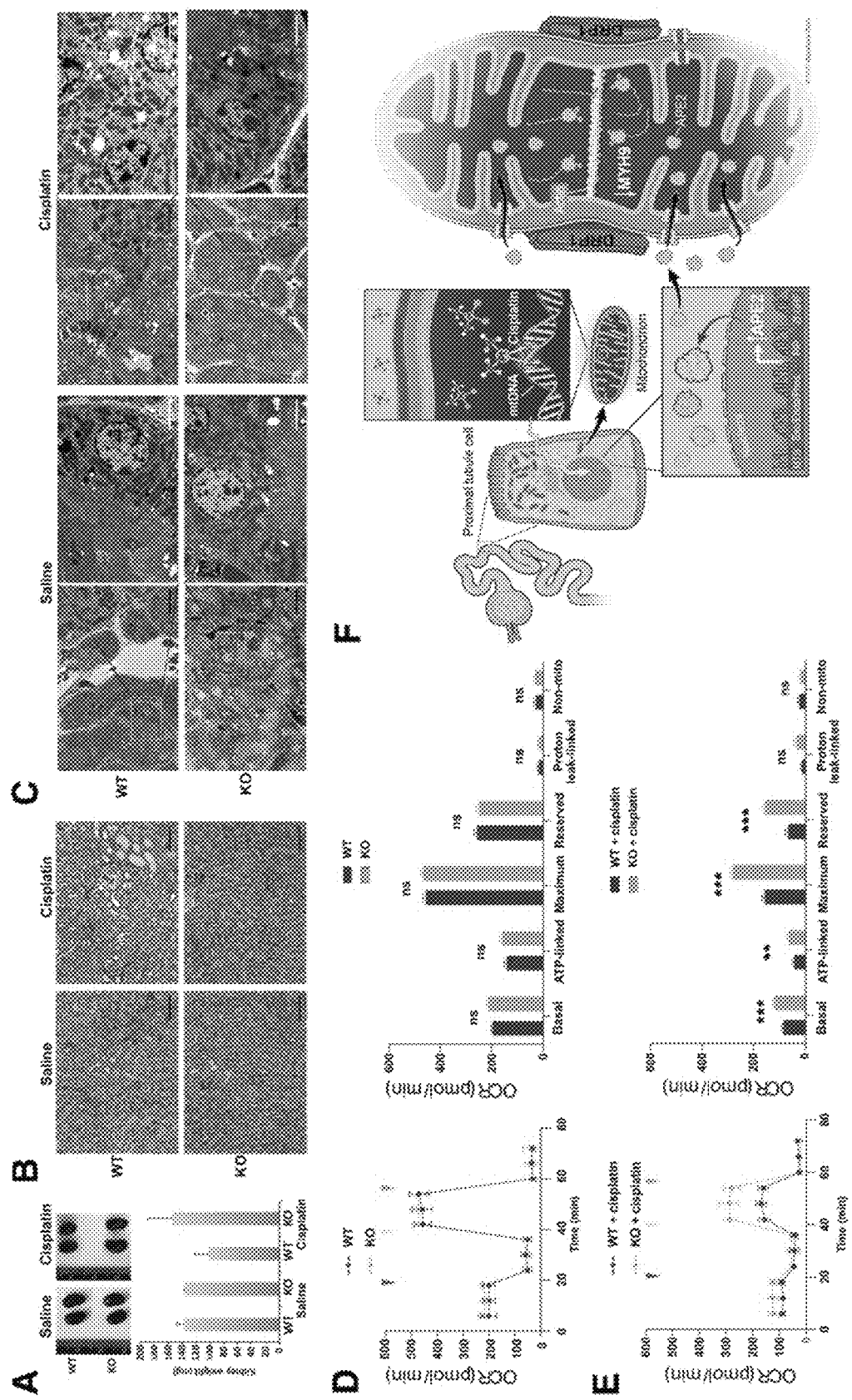
FIG. 7. Attenuation of C-AKI in APE2 KO mice. A, Representative kidney image (top) and weight (bottom) of 6-week-old male wild-type (WT) C57B6 mice and APE2 knockout (KO) mice treated with saline or a single dose of 15 mg/kg cisplatin, followed by euthanization after one week. B, Hematoxylin and eosin staining of kidney from saline- or cisplatin-treated WT and KO mice. Scale bar, 100 μm. C, EM images of kidney from saline- or cisplatin-treated WT and KO mice. Black scale bar, 8 μm; white scale bar, 2 μm. D and E, OCR analysis of primary PTCs from WT (n=3) and KO mice (n=3) without (D) and with (E) cisplatin treatment. Injections were composed of oligomycin (red arrow), carbonyl cyanide p-trifluoromethoxyphenylhydrazone (FCCP; yellow arrow), or a combination of rotenone and antimycin A (green arrow). ns, not significant; , $P<0.01$; *, $P<0.001$. F, Hypothetical, non-limiting, model in which APE2 binding to MYH9 in mitochondria induces AKI.

To test whether APE2 KO can prevent cisplatin-induced AKI, we used APE2-null male mice (12) and wild-type male mice to perform the study. The APE2-null male mice showed moderate growth retardation (12). Their body weight was only approximately 80% of the weight of their wild-type littermates at birth, and this decrease persisted into adulthood, indicating that all developing APE2-null embryos, infants, and adults are somehow retarded in their growth. We treated 6-week-old wild-type (WT) and APE2 KO mice with cisplatin and then toxicity was evaluated at one-week post-treatment. Renal damage was most severe in WT mice, which also had decreased kidney weight. In contrast, APE2 KO mice (FIG. 7A) had only minor kidney damage (FIG. 7B) and less mitochondrial fragmentation (FIG. 7C), suggesting that APE2 KO in cisplatin-treated mice can prevent C-AKI development. To examine mitochondrial functional activity in PTCs from WT and APE2 KO mice, PTCs were isolated and subjected to Cell Mito Stress assay by using Seahorse. As shown in FIG. 7D, the OCR was similar in nontreated WT and APE2 KO PTCs. After the mice were treated by cisplatin, however, OCR in PTCs was significantly increased in APE2 KO mice (FIG. 7E).

Because the molecular mechanism of action of C-AKI has not been determined until now, we still have no genetic engineered mouse model that recapitulates the clinical features of C-AKI. Currently, only cisplatin-induced AKI (C-AKI) mouse model is widely used. Many potential kidney-protective therapies have been tested in this laboratory model and have been found to provide some therapeutic benefit, but unfortunately all of them failed in early-stage clinical trials (24). If we had available a functionally engineered transgenic mouse model based on the mechanism underlying C-AKI and accurately reflecting human pathogenesis, we could determine not only the etiology and pathology of C-AKI, but also develop preventive strategies and decrease the need for cisplatin dose adjustment or cessation. Cisplatin treatment caused the proximal and distal tubular necrosis in the mouse kidney. Notably, the kidney proteins related to the BER pathway, such as APE2, APE1, and LIG3, homologous recombination (HR) pathway, such as MRE11 and CTIP, were increased whereas PCNA was decreased after treatment with cisplatin. In APE2-overexpressing transgenic mice, similar pathological features were found in mouse kidney. However, expression of additional kidney proteins (MRE11 and CTIP) was observed. The discrepancy of MRE11 and CTIP expression found between C-AKI and APE2-AKI mice models may be ascribed to the fact that MRE11 and CTIP are related to HR pathway but not BER pathway, which is only responsively upregulated in C-AKI mice but not in APE2-AKI mice. The most attractive feature of our APE2 AKI mouse model is that it mechanistically recapitulates cisplatin-induced kidney damage but excludes other cisplatin-induced DNA damage repair response such as the HR pathway.

While the present invention is not limited to any particular mechanism, and an understanding of the mechanism is not necessary to practice the invention, it is believe, from our mechanistic studies, that when APE2 overexpression is induced by cisplatin, the APE2 that is enriched in mitochondria binds to MYH9 and subsequently interferes with mitochondrial fission (FIG. 7F). MYH9 mutations are associated with several human syndromes, currently grouped as MYH9-related disorders, which are characterized by kidney disease, hearing loss, thrombocytopenia, and cataracts (25, 26). Three hexameric isoforms—IIA, IIB, and IIC—are encoded by MYH9, MYH10, and MYH14, respectively, all of which have a similar structure. The MYH9 isoform has important roles in cell adhesion, migration, proliferation, and differentiation (27). Some patients with MYH9 mutations develop progressive proteinuria, glomerulosclerosis, and kidney failure (28). MYH9 SNPs have been proposed as a major genetic risk locus for non-diabetic end-stage kidney disease (26). Functional studies of the three isoforms in mice have elucidated both unique and redundant functions for MYH9 and MYH10 (29). The importance of MYH14 is unknown, as global MYH14 knockout in mice has no obvious phenotype (30). The variable occurrence of the kidney-specific phenotype in patients with MYH9-related disorders is possibly due to the type of MYH9 mutation, along with variable compensation by MYH10 and MYH14 (23). Other potential explanations include defects in endocytosis and receptor-mediated transport in tubule epithelial cells and defects in glomerular filtration, but the exact mechanism underlying MYH9-related disease is not clear. Pathological mutations in MYH9 cause kidney dysfunction, hearing loss, and hematopoietic disorders in humans, clinical features that are also seen with cisplatin treatment, suggesting that the underlying pathophysiological mechanisms may be similar.

Two recent reports indicate that MYH9 and actin contribute to mammalian mitochondrial DNA integrity and fission (31, 32). Impaired mtDNA homeostasis may account for one or more of the clinical features associated with MYH9 mutation (31). Accumulated data also point to the involvement of MYH9 and/or actin in membrane morphogenesis events, such as mitochondrial fission (33). Mitochondrial fission is involved in a quality-control mechanism whereby damaged mitochondrial components are segregated from healthy ones, with subsequent mitochondrial fission and degradation of the damaged daughter mitochondrion (33). Mitochondrial fission requires action by the enzyme dynamin GTPase (DRP1; ref 34). However, mechanisms controlling DRP1 assembly in mammalian mitochondria are unclear. Recent results from Korobova and colleagues (33) show that MYH9 inhibition decreases DRP1 association with mitochondria and plays an important role in mitochondrial fission. These authors proposed a mechanistic model in which actin polymerization leads to myosin II recruitment and constriction at the fission site, enhancing subsequent DRP1 accumulation and fission. Further study of the dynamic functional relationship between APE2, MYH9, actin, and DRP1 will further unravel the molecular mechanism and pathogenesis of C-AKI. The influence of gender on cisplatin tolerability in rodents and patients is not entirely certain. One study has found that male C57BL/6 mice possess approximately 10-fold higher levels of GSTP expression in the liver than females and are more susceptible to cisplatin nephrotoxicity (35), whereas another study has found female mice (C57BL/6J and 129Sv) to be more susceptible than males (36). In the present work, we found no differences in phenotype development between genders in our APE2 transgenic cohort.

Example 2

Figure 8:
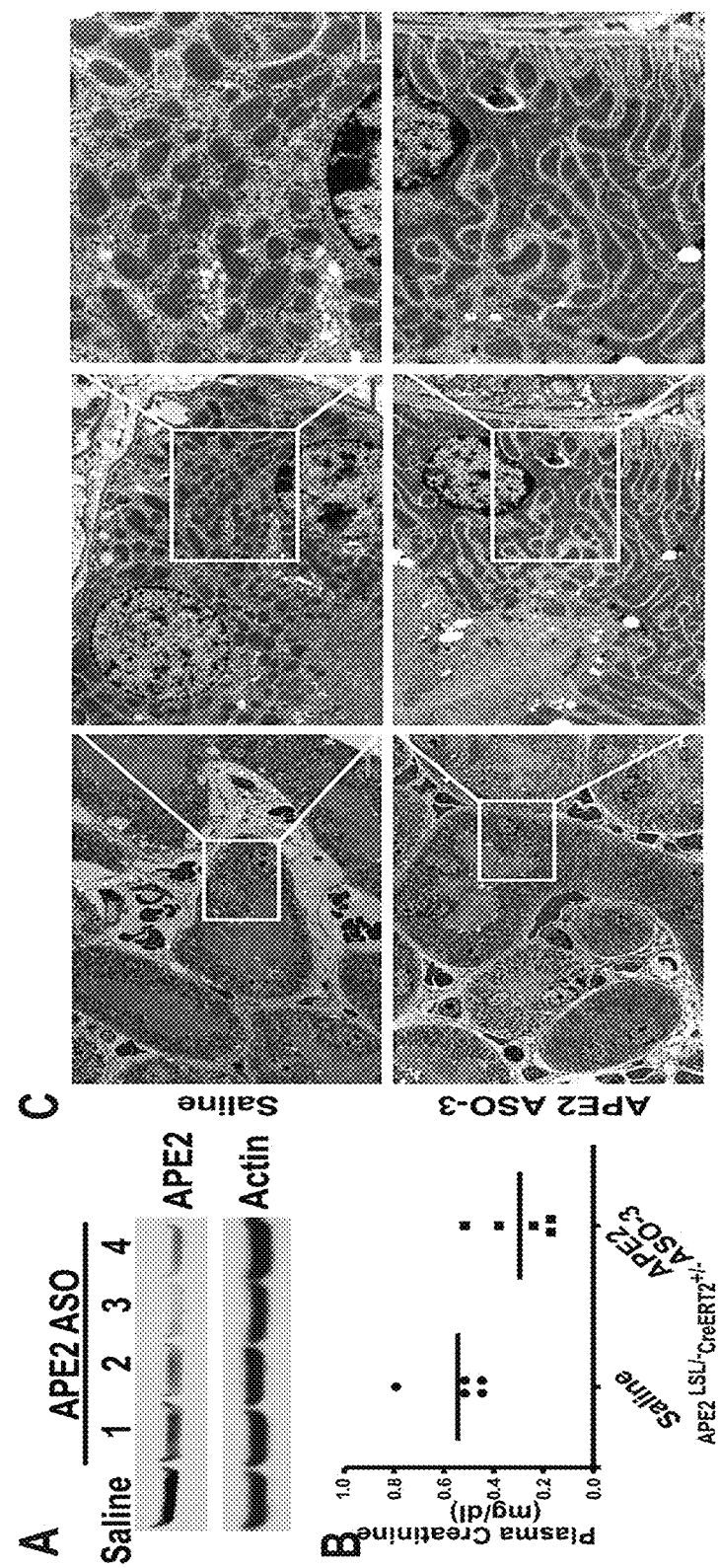
FIG. 8. APE2-ASO gapmer drug protected kidney function of APE2 AKI mouse model. (A) APE2 ASOs knock down APE2 overexpression in PTCs from CreERT2$^{+/-}$, APE2$^{LSL/-}$ mice, and (B) significantly reduced the plasma creatine level in APE2 ASO-3 treated CreERT2$^{+/-}$, APE2$^{LSL/-}$ mice compared with saline treated controls. $P<0.01$. (C) Mitochondrial fragmentation checked by EM at the age of eight weeks relative to mice treated with saline for four weeks.

Antisense Oligo Drug Targeting Apurinic/Apyrimidinic Endonuclease 2 (APE2) for Cisplatin Induced Acute Kidney Injury Prophylaxis Treatment A gapmer DNA ASOs was designed with 2'-OMe modification of the nucleotides and stabilization of the 5'-phosphate group targeting APE2 in order to knock down APE2 expression and performed an APE2 loss of function study in transgenic CreERT2+/−, APE2LSL/− mice. The gapmer DNA was flanked by blocks of 2'-OMe modified RNAs, which bind to APE2 RNA and induce cleavage of APE2 by RNase H(1). Western blot analysis confirmed that APE2 was efficiently knocked down in primary PTCs from these transgenic mice (FIG. 8A). One of them APE2-ASO-3 is with the sequence of mU*mG*mU*C*C*T*T*A*C*A*G*A*A*mG*mG*mU (SEQ ID NO:1) was synthesized for further animal studies in transgenic CreERT2+/−, APE2LSL/− mice. We found that kidney function was protected after using APE2-ASO treated 4 weeks, and once per week (FIG. 8B). Mitochondrial morphology remained relatively normal in APE2-ASO treated mice when compared with vehicle treated mice checked by EM (FIG. 8C). These data support the idea that targeting APE2 and mitochondria is a practical therapeutic strategy for the prophylaxis or treatment of AKI providing a solid foundation for the experiments described below.

Figure 9:
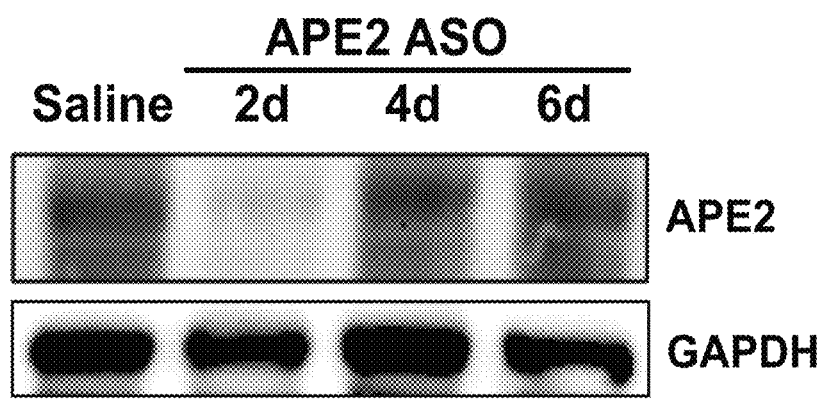
FIG. 9. APE2-ASO gapmer drug knock down APE2 level in wild type C57B6 mice.

Further optimization of the ASO drug. Potential ASO toxicities fall into two categories: (i) hybridization-dependent toxicities due to on- or off-target events, and (ii) hybridization-independent toxicities, such as excessive immunostimulation due to non-antisense effects of the ASO. We performed the PK/PD study using C57B6 mice. We IP injected six weeks old male mice with 20 mg/kg APE2-ASO and checked the APE2 expression by western blot analysis. We found the APE2 could be knock down in two days and restored in 4 days after injection (FIG. 9).

REFERENCES

1. Ozkok and Edelstein, Pathophysiology of cisplatin-induced acute kidney injury. Biomed Res Int 2014; 2014: 967826.
2. Boulikas and Vougiouka, Cisplatin and platinum drugs at the molecular level. (Review). Oncol Rep 2003; 10:1663-82.
3. Galea and Murray, The interaction of cisplatin and analogues with DNA in reconstituted chromatin. Biochim Biophys Acta 2002; 1579:142-52.
4. Safirstein et al., Uptake and metabolism of cisplatin by rat kidney. Kidney Int 1984; 25:753-8.
5. Dobyan et al., Mechanism of cis-platinum nephrotoxicity: II. morphologic observations. J Pharmacol Exp Ther 1980; 213:551-6.
6. Tsuruya et al., Direct involvement of the receptor-mediated apoptotic pathways in cisplatin-induced renal tubular cell death. Kidney Int 2003; 63:72-82.
7. Bhargava and Schnellmann, Mitochondrial energetics in the kidney. Nat Rev Nephrol 2017; 13:629-46.
8. Saki and Prakash, DNA damage related crosstalk between the nucleus and mitochondria. Free Radic Biol Med 2017; 107:216-27.
9. Alexeyev et al., The maintenance of mitochondrial DNA integrity-critical analysis and update. Cold Spring Harb Perspect Biol 2013; 5:a012641.
10. Cline S D. Mitochondrial DNA damage and its consequences for mitochondrial gene expression. Biochim Biophys Acta 2012; 1819:979-91.
11. Tsuchimoto et al., Human APE2 protein is mostly localized in the nuclei and to some extent in the mitochondria, while nuclear APE2 is partly associated with proliferating cell nuclear antigen. Nucleic Acids Res 2001; 29:2349-60.
12. Ide et al., Growth retardation and dyslymphopoiesis accompanied by G2-M arrest in APEX2-null mice. Blood 2004; 104:4097-103.
13. Guikema et al., Apurinic/apyrimidinic endonuclease 2 is necessary for normal B-cell development and recovery of lymphoid progenitors after chemotherapeutic challenge. J Immunol 2011; 186:1943-50.
14. Stavnezer et al., Differential expression of APE1 and APE2 in germinal centers promotes error-prone repair and A:T mutations during somatic hypermutation. Proc Natl Acad Sci USA 2014; 111:9217-22.
15. Lin et al., APE2 promotes DNA damage response pathway from a single-strand break. Nucleic Acids Res 2018; 46:2479-94.
16. Johnstone et al., Podocyte-specific deletion of Myh9 encoding nonmuscle myosin heavy chain 2A predisposes mice to glomerulopathy. Mol Cell Biol 2011; 31:2162-70.
17. Zhang et al., Mouse models of MYH9-related disease: mutations in non-muscle myosin II-A. Blood 2012; 119:238-50.
18. Ventura et al., Restoration of p53 function leads to tumour regression in vivo. Nature 2007; 445:661-5.
19. Ide et al., Characterization of the genomic structure and expression of the mouse Apex2 gene. Genomics 2003; 81:47-57.
20. Hu Y et al., Targeting the MALAT1/PARP1/LIG3 complex induces DNA damage and apoptosis in multiple myeloma. Leukemia 2018; 32:2250-62.
21. Perse and Veceric-Haler, Cisplatin-induced rodent model of kidney injury: characteristics and challenges. Biomed Res Int 2018; 2018:1462802.
22. Burkovics et al., Role of PCNA-dependent stimulation of 3'-phosphodiesterase and 3'-5' exonuclease activities of human Ape2 in repair of oxidative DNA damage. Nucleic Acids Res 2009; 37:4247-55.
23. Otterpohl et al., Nonmuscle myosin 2 proteins encoded by Myh9, Myh10, and Myh14 are uniquely distributed in the tubular segments of murine kidney. Physiol Rep 2017; 5:e13513.
24. Sharp and Siskind L J, Developing better mouse models to study cisplatin-induced kidney injury. Am J Physiol Renal Physiol 2017; 313:F835-F41.
25. Heath et al., Nonmuscle myosin heavy chain IIA mutations define a spectrum of autosomal dominant macrothrombocytopenias: May-Hegglin anomaly and Fechtner, Sebastian, Epstein, and Alport-like syndromes. Am J Hum Genet 2001; 69:1033-45.
26. Tzur et al., Missense mutations in the APOL1 gene are highly associated with end stage kidney disease risk previously attributed to the MYH9 gene. Hum Genet 2010; 128:345-50.
27. Ma and Adelstein, The role of vertebrate nonmuscle Myosin II in development and human disease. Bioarchitecture 2014; 4:88-102.
28. Pecci et al., Position of nonmuscle myosin heavy chain IIA (NMMHC-IIA) mutations predicts the natural history of MYH9-related disease. Hum Mutat 2008; 29:409-17.
29. Wang et al., Nonmuscle myosin II isoform and domain specificity during early mouse development. Proc Natl Acad Sci USA 2010; 107:14645-50.
30. Ma et al., Ablation of nonmuscle myosin II-B and II-C reveals a role for nonmuscle myosin II in cardiac myocyte karyokinesis. Mol Biol Cell 2010; 21:3952-62.
31. Reyes et al., Actin and myosin contribute to mammalian mitochondrial DNA maintenance. Nucleic Acids Res 2011; 39:5098-108.
32. Hatch et al., Novel roles for actin in mitochondrial fission. J Cell Sci 2014; 127:4549-60.
33. Korobova et al., A role for myosin II in mammalian mitochondrial fission. Curr Biol 2014; 24:409-14.
34. Fonseca et al., Mitochondrial fission requires DRP1 but not dynamins. Nature 2019; 570:E34-E42.
35. Townsend et al., Role of glutathione S-transferase Pi in cisplatin-induced nephrotoxicity. Biomed Pharmacother 2009; 63:79-85.
36. Wei et al., Differential gender differences in ischemic and nephrotoxic acute renal failure. Am J Nephrol 2005; 25:491-9.
37. Lennox and Behlke, Cellular localization of long non-coding RNAs affects silencing by RNAi more than by antisense oligonucleotides. Nucleic acids research 2016; 44:863-77

All publications and patents mentioned in the specification and/or listed below are herein incorporated by reference. Various modifications and variations of the described method and system of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention that are obvious to those skilled in the relevant fields are intended to be within the scope described herein.

We claim:

1. A method of protecting kidney function in a subject comprising: treating a subject having cisplatin-treated cancer with:
   i) an apurinic/apyrimidinic endonuclease 2 (APE2) inhibitor, wherein said APE2 inhibitor comprises: i) an antisense oligonucleotide directed toward APE2 mRNA or DNA, or ii) an siRNA sequence directed toward APE2 mRNA, and
   ii) a drug agent that causes increased expression of APE2 in said subject, wherein said drug agent comprises cisplatin,
   and wherein said subject is administered an amount of said drug agent that is at least 15 mg/kg, and causes acute kidney injury in said subject in the absence of said APE2 inhibitor, and
   wherein said APE2 inhibitor is administered before said drug agent.

2. The method of claim 1, wherein said APE2 inhibitor comprises said siRNA sequence directed toward APE2 mRNA.

3. The method of claim 1, wherein said APE2 inhibitor comprises: said antisense oligonucleotide directed toward APE2 mRNA or DNA.

4. The method of claim 1, wherein said subject is a human.

5. The method of claim 1, further comprising detecting, in a sample from the subject, the level of APE2 mRNA or protein.

* * * * *